US012695739B2

(12) United States Patent
Lee et al.

(10) Patent No.: US 12,695,739 B2
(45) Date of Patent: Jul. 28, 2026

(54) METHOD AND APPARATUS OF MANAGING ACCESS TO VIRTUAL SPACES BASED ON DIGITAL NON-FUNGIBLE TOKENS

(71) Applicant: Dunamu Inc., Seoul (KR)

(72) Inventors: Jinyee Lee, Gwangmyeong-si (KR); Jaehyun Kim, Seoul (KR); Mooyeol Kim, Suwon-si (KR); Eunhye Hwang, Seoul (KR)

(73) Assignee: Dunamu Inc., Seoul (KR)

( * ) Notice: Subject to any disclaimer, the term of this patent is extended or adjusted under 35 U.S.C. 154(b) by 311 days.

(21) Appl. No.: 18/352,516

(22) Filed: Jul. 14, 2023

(65) Prior Publication Data

US 2024/0073198 A1     Feb. 29, 2024

(30) Foreign Application Priority Data

Aug. 24, 2022    (KR) ........................ 10-2022-0106018
Feb. 28, 2023    (KR) ........................ 10-2023-0026479

(51) Int. Cl.
*H04L 29/06*        (2006.01)
*H04L 9/40*         (2022.01)

(52) U.S. Cl.
CPC ........ *H04L 63/083* (2013.01); *H04L 63/0823* (2013.01)

(58) Field of Classification Search
CPC ........................... H04L 63/083; H04L 63/0823
See application file for complete search history.

(56) References Cited

U.S. PATENT DOCUMENTS 10,505,726 B1 * 12/2019 Andon ............... G06Q 10/0875
12,118,527 B2 * 10/2024 Yantis ................. G06Q 20/123
(Continued)

FOREIGN PATENT DOCUMENTS

JP        2024-8462 A     1/2024
KR   10-2022-0070921 A    5/2022

OTHER PUBLICATIONS

Sakib Shahriar et al., NFTGAN: Non-Fungible Token Art Generation Using Generative Adversarial Networks, Jun. 10, 2022, ACM, pp. 255-259. (Year: 2022).*

(Continued)

*Primary Examiner* — Luu T Pham
*Assistant Examiner* — Fahimeh Mohammadi
(74) *Attorney, Agent, or Firm* — NSIP Law

(57) ABSTRACT

A method includes obtaining, from a terminal operated by a user, by a processor connected with a computer network including a blockchain service, an access request to request access to an area of a virtual space including multiple areas; based on the access request, obtaining, by the processor, first information including non-fungible token information, the first information configured to be used to determine whether the user is authorized to access the area of the virtual space; verifying, by the processor, based on the first information, an access right of whether the area of the virtual space is accessible to the user by determining whether a non-fungible token is owned by the user and by determining whether the non-fungible token satisfies the non-fungible token information of the first information; and based on a result of the verifying, transmitting to the terminal, by the processor, a response to the access request.

18 Claims, 14 Drawing Sheets

(56) References Cited

U.S. PATENT DOCUMENTS

| | | | | |
|---|---|---|---|---|
| 2009/0254747 | A1* | 10/2009 | Bussani | H04L 63/0884 |
| | | | | 713/168 |
| 2021/0256070 | A1* | 8/2021 | Tran | G06F 16/9536 |
| 2021/0319132 | A1* | 10/2021 | Zhang | H04L 9/3239 |
| 2022/0407702 | A1* | 12/2022 | Jakobsson | H04L 9/50 |
| 2023/0045546 | A1* | 2/2023 | Kim | H04L 9/3265 |
| 2023/0266930 | A1* | 8/2023 | Baker | G06F 21/608 |
| | | | | 358/1.14 |
| 2023/0316263 | A1* | 10/2023 | Eby | H04L 9/3271 |
| 2023/0334472 | A1* | 10/2023 | Pene | G06Q 20/10 |
| 2023/0368184 | A1* | 11/2023 | Polasa | G06Q 20/363 |
| 2023/0379159 | A1* | 11/2023 | Singh | H04L 9/50 |
| 2024/0013199 | A1* | 1/2024 | Marshall | G06Q 20/3274 |
| 2024/0031162 | A1* | 1/2024 | Singh | H04L 9/3236 |
| 2024/0127211 | A1* | 4/2024 | Newton | G06Q 20/065 |
| 2024/0273518 | A1* | 8/2024 | Eby | G06Q 20/3674 |

OTHER PUBLICATIONS

Logan Kugler, Non-fungible tokens and the future of art, No. 9, 2021, ACM, vol. 64, pp. 19-20. (Year: 2021).*
Johannes Deyoung et al., The Accursed Share of Non-fungibles, Jul. 26, 2022, ACM, Article No. 16, pp. 1-2. (Year: 2022).*
Farhan Khan et al., Enhancing Non-Fungible Tokens for the Evolution of Blockchain Technology, Apr. 27, 2022, IEEE. pp. 1148-1153. (Year: 2022).*
Singh "NFTs Will be Key to Accessing the Metaverse—and Beyond" Decrypt, Oct. 14, 2021, (16 pages).

* cited by examiner

Figure 8:
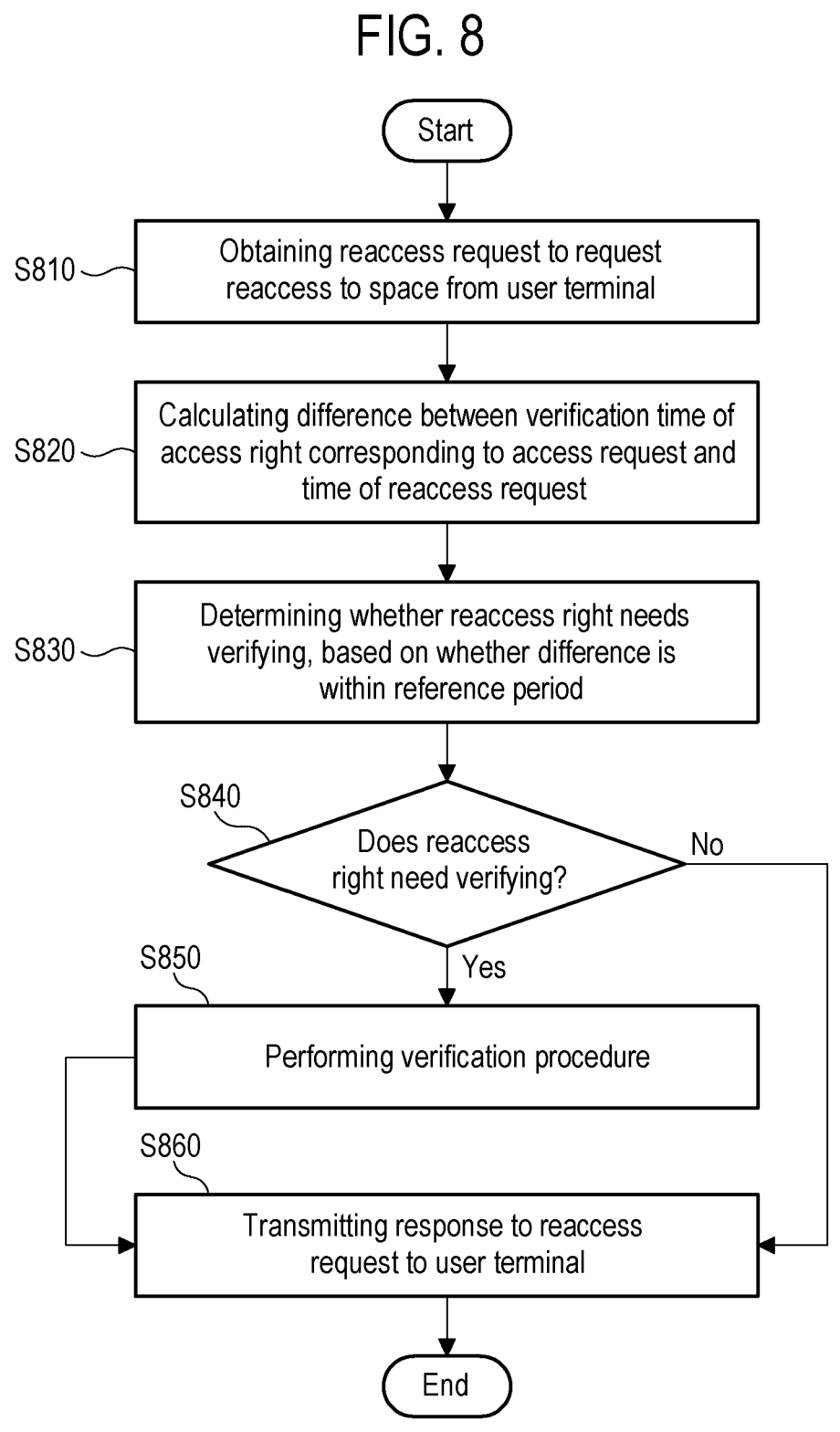

Start

S810 — Obtaining reaccess request to request reaccess to space from user terminal S820 — Calculating difference between verification time of access right corresponding to access request and time of reaccess request S830 — Determining whether reaccess right needs verifying, based on whether difference is within reference period S840 — Does reaccess right need verifying?

No

Yes

S850 — Performing verification procedure

S860 — Transmitting response to reaccess request to user terminal

End

FIG. 9

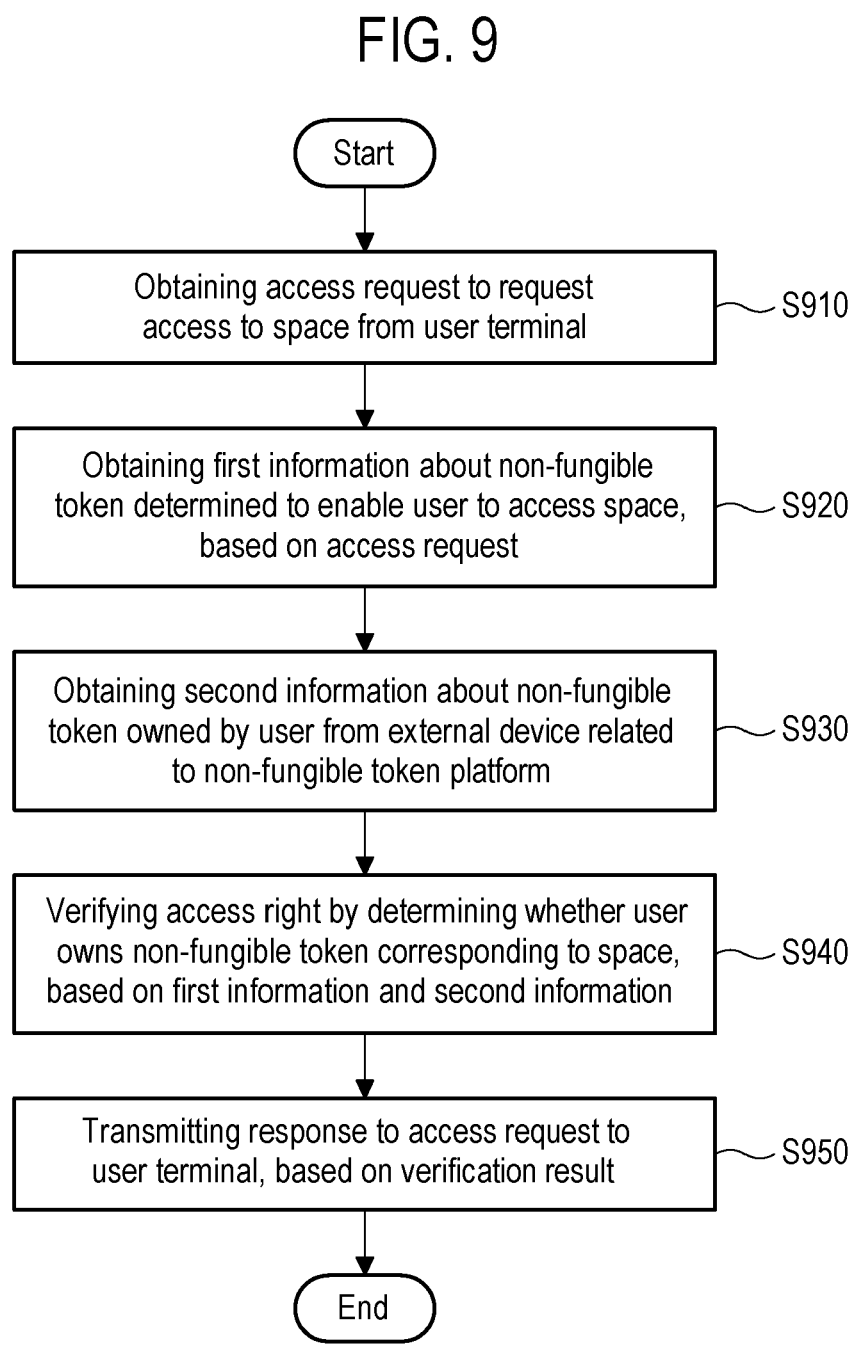

Start

Obtaining access request to request access to space from user terminal — S910

Obtaining first information about non-fungible token determined to enable user to access space, based on access request — S920

Obtaining second information about non-fungible token owned by user from external device related to non-fungible token platform — S930

Verifying access right by determining whether user owns non-fungible token corresponding to space, based on first information and second information — S940

Transmitting response to access request to user terminal, based on verification result — S950

End

Start

Transmitting second authentication token for reissuing first authentication token to first external device when validity period of first authentication token expires — S1110

Obtaining first authentication token from first external device, based on second authentication token — S1120

End

FIG. 14

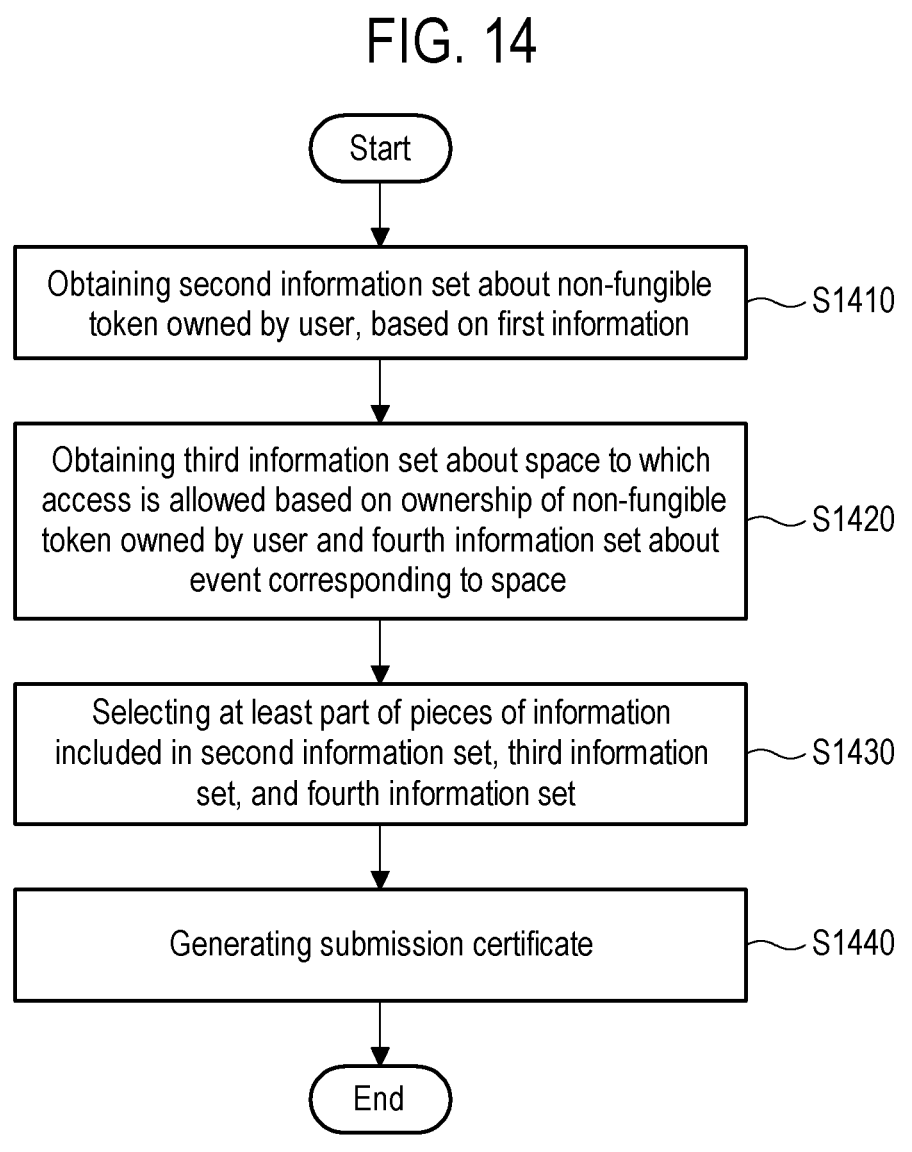

```
                    ┌─────────┐
                    │  Start  │
                    └─────────┘
                         │
                         ▼
┌─────────────────────────────────────────┐
│ Obtaining second information set about    │
│ non-fungible token owned by user, based   │──── S1410
│ on first information                      │
└─────────────────────────────────────────┘
                         │
                         ▼
┌─────────────────────────────────────────┐
│ Obtaining third information set about     │
│ space to which access is allowed based    │
│ on ownership of non-fungible token        │──── S1420
│ owned by user and fourth information set  │
│ about event corresponding to space        │
└─────────────────────────────────────────┘
                         │
                         ▼
┌─────────────────────────────────────────┐
│ Selecting at least part of pieces of      │
│ information included in second            │──── S1430
│ information set, third information set,    │
│ and fourth information set                │
└─────────────────────────────────────────┘
                         │
                         ▼
┌─────────────────────────────────────────┐
│ Generating submission certificate         │──── S1440
└─────────────────────────────────────────┘
                         │
                         ▼
                    ┌─────────┐
                    │   End   │
                    └─────────┘
```

METHOD AND APPARATUS OF MANAGING ACCESS TO VIRTUAL SPACES BASED ON DIGITAL NON-FUNGIBLE TOKENS

CROSS-REFERENCE TO RELATED APPLICATIONS

This application is based upon and claims the benefit of priority under 35 USC § 119(a) of Korean Patent Application No. 10-2022-0106018, filed in the Korean Intellectual Property Office on Aug. 24, 2022, and Korean Patent Application No. 10-2023-0026479, filed in the Korean Intellectual Property Office on Feb. 28, 2023, the entire contents of which are incorporated herein by reference.

BACKGROUND

1. Field

The present disclosure relates to techniques for managing access to virtual spaces based on non-fungible tokens.

2. Description of Related Art

Recently, there has been a growing interest in content that realizes real-world interactions in a virtual space, that is, a metaverse. A metaverse may be applied to various industrial fields besides the entertainment industry, and thus is expected to provide a three-dimensional experience to users for various purposes.

SUMMARY

The following summary is for exposition only and does not delineate claimed subject matter.

In one general aspect a method includes: obtaining, from a terminal operated by a user, by a processor connected with a computer network including a blockchain service, an access request to request access to an area of a virtual space including a plurality of areas; based on the access request, obtaining, by the processor, first information including non-fungible token information, the first information configured to be used to determine whether the user is authorized to access the area of the virtual space; verifying, by the processor, an access right of whether the area of the virtual space is accessible to the user by determining whether a non-fungible token is owned by the user and by determining whether the non-fungible token satisfies the non-fungible token information of the first information; and based on a result of the verifying, transmitting to the terminal, by the processor, a response to the access request.

The area, and a second area of the virtual space, may be areas to which an object in the virtual space is moveable to, the object representing the user, wherein the transmitting of the response may include transmitting to the terminal a first response indicating that a first service set is activated responsive to the object accessing the first area and transmitting to the terminal a second response indicating that a second service set is activated responsive to the object accessing the second area.

The first service set may include one or more first interactive objects configured to interact with the object, and wherein the second service set includes one or more second interactive objects configured to interact with the object.

The verifying of the access right may include: obtaining second information about the non-fungible token of the user, the second information including a second item, and the first information including a first item; and verifying that the user has the access right to the area by determining that the first item corresponds to the second item.

The one or more first items may include a first list of non-fungible tokens determined to enable the access, a token identifier, metadata, and a contract address of each non-fungible token included in the first list, and/or a virtual space identifier for identifying the virtual space, and wherein the one or more second items include a second list of non-fungible tokens owned by the user, a token identifier, metadata, and a contract address of each non-fungible token included in the second list, and/or a virtual space identifier for identifying a virtual space related to each non-fungible token included in the second list.

The verifying of the access right may include determining that the user owns a first non-fungible token and a second non-fungible that satisfy the non-fungible token information of the first information.

The transmitting of the response may include transmitting, to the terminal, a link that enables access to the virtual space corresponding to the access request.

In another general aspect, a method performed by one or more computing devices, includes: obtaining, by a processor connected with a computer network including a blockchain network, from a terminal of a user, an access request to request access to an area of a virtual space including multiple areas; obtaining, based on the access request, by the processor, first information including non-fungible token information, the first information determined to be used to authorize access to the area; obtaining, by the processor, second information about a non-fungible token owned by the user, wherein the second information is obtained from a non-fungible token platform; verifying, by the processor, an access right of whether the user is authorized to access the area by determining that the non-fungible token is owned by the user, and by determining, based on the first information and the second information, whether the non-fungible token owned by the user corresponds to the first information about a non-fungible token; and transmitting, by the processor, to the terminal, a response to the access request, wherein the response is based on a verification result of the verifying.

The obtaining of the second information may include: obtaining a first authentication token from a first external device related to authentication of the non-fungible token platform, based on user information about the user; requesting the second information from a second external device related to a resource of the non-fungible token platform by using the first authentication token; and obtaining the second information from the second external device.

In yet another general aspect a method includes: obtaining, from a terminal of a user, an access request to request access to an area of a virtual space including multiple areas including the area; obtaining, based on the access request, first information including non-fungible token information configured to be used to verify user access to the area; obtaining, from the terminal, a submission certificate generated based on the first information and proving that the user owns a non-fungible token; verifying, based on the submission certificate, an access right of the user to access the area by determining that the user owns the non-fungible token; and transmitting, by the processor, a response to the access request to the terminal of the user, based on a verification result.

The submission certificate may include one or more verification items about the non-fungible token owned by the user, and the verifying of the access right may include: selecting a target verification item among the one or more verification items; and verifying the access right based on a verification input value of the user obtained corresponding to the target verification item.

The obtaining of the submission certificate may include obtaining an identifier of the user, wherein the identifier includes a storage location of an identification document in a blockchain network, and the identification document may include the one or more verification items, one or more verification values corresponding to each of the one or more verification items, and a public key of the user.

The obtaining of the submission certificate may include: transmitting the first information to the terminal of the user; and obtaining a submission certificate including a verification item corresponding to one or more first items included in the first information from the terminal of the user in response to transmission of the first information, and the one or more first items may include a first list of non-fungible tokens determined to enable the access, a token identifier, metadata, a contract address of each non-fungible token included in the first list, and a virtual space identifier for identifying the virtual space.

The verifying of the access right may include: generating verification request information by encrypting the target verification item with the public key; transmitting the verification request information to the terminal of the user; obtaining a verification input value corresponding to the target verification item decrypted with a private key corresponding to the public key from the terminal of the user in response to the verification request information; and verifying the access right by identifying whether a verification value corresponding to the target verification item included in the identification document obtained from the blockchain network corresponds to the verification input value obtained from the terminal of the user.

In another general aspect, a method includes: receiving a request to access an area of a virtual space, wherein the request is generated responsive to an interaction, based in input of a user, with the virtual space; based on the request, obtaining an access authorization condition; based on the request, obtaining non-fungible token information about a non-fungible token owned by the user; and authorizing access to the area of the virtual space for the user by determining that the non-fungible token is owned by the user and that the non-fungible token information satisfies the access authorization condition.

The method may further include: obtaining, based on user information about the user, a first authentication token from a first external device related to authentication of a non-fungible token platform; requesting the non-fungible token information from a second external device related to a resource of the non-fungible token platform by using the first authentication token; and obtaining the non-fungible token information from the second external device.

The interaction with the virtual space may include determining, by a platform providing the virtual space, that an object manipulated by user input has encountered the area of the virtual space.

The non-fungible token information may include a set of token conditions, wherein the non-fungible token information includes information included in, or pointed to by, the non-fungible token owned by the user.

The set of conditions may include two or more of: a non-fungible token value condition, a non-fungible token identifier condition, a non-fungible token type condition, non-fungible token trading system condition, a token classification condition, and a smart contract condition.

The granting access may enable a device operated by the user to access a set of services associated with the area.

The granting access may further include determining that the non-fungible token is owned by the user.

The non-fungible token may be generated by a smart contract.

Ownership of the non-fungible token by the user may be recorded in a blockchain and the granting access may include determining, according to the blockchain, that the non-fungible token is owned by the user.

The virtual space includes a three-dimensional model, and wherein the authorizing access to the area enables access, through a user interface of the virtual space, to a service provided through a platform that provides the virtual space.

BRIEF DESCRIPTION OF THE DRAWINGS

The accompanying drawings, which are incorporated in and constitute a part of the specification, illustrate embodiments of the present disclosure.

FIG. 4 illustrates another example space according to one or more embodiments.

FIG. 8 illustrates a method according to one or more embodiments.

FIG. 9 illustrates a method according to one or more embodiments.

FIG. 14 illustrates a method according to one or more embodiments.

DETAILED DESCRIPTION

Figure 1:
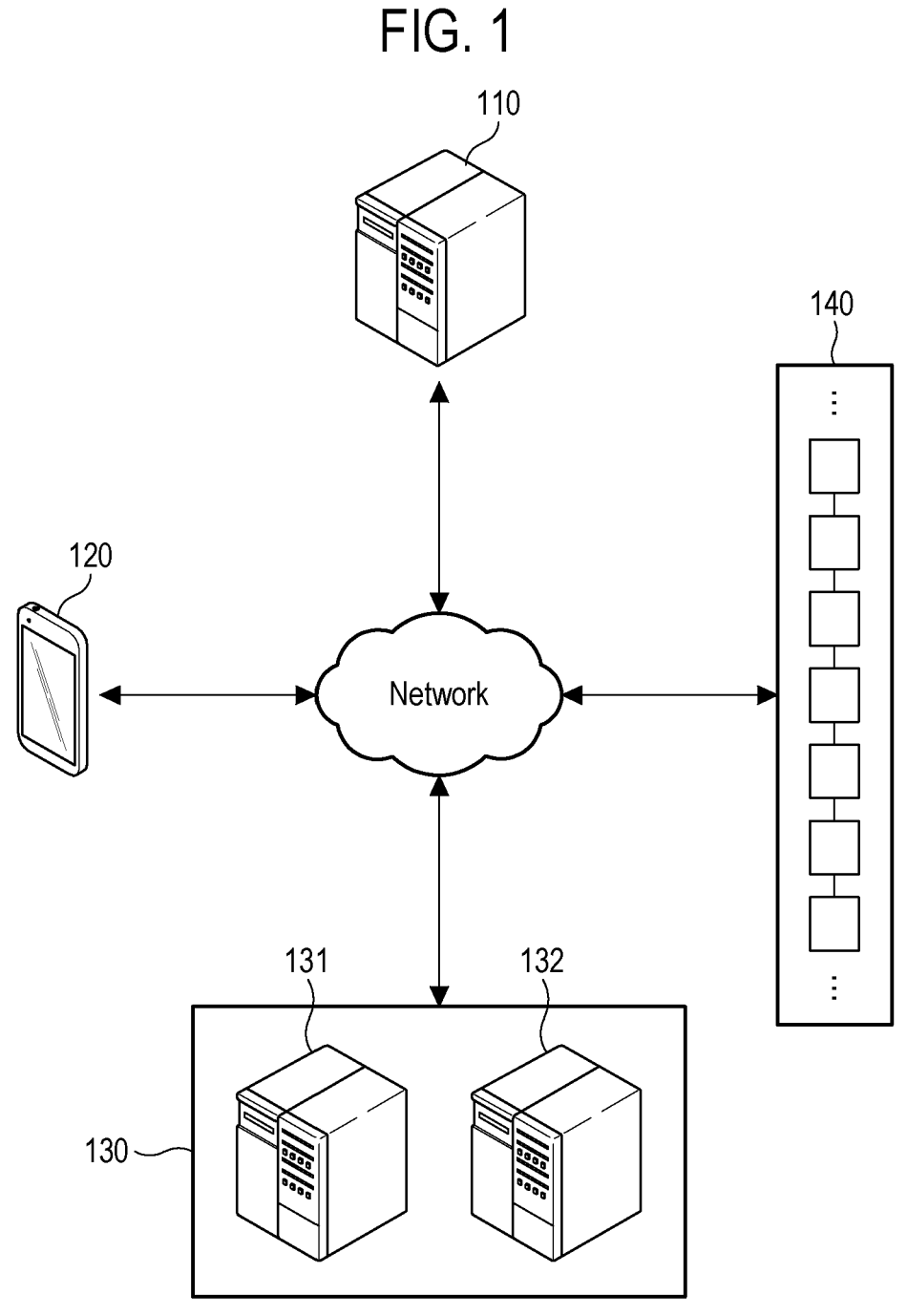
FIG. 1 illustrates an environment including devices applicable to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

The term "space" as used herein refers to a physically or abstractly widespread range. In an embodiment, a space may be a physical space with a widespread range. In another embodiment, a space may be a virtual space in which interactions in a physical space are represented.

The term "non-fungible token (NFT)" as used herein refers to a set of electronic information in which a unique recognition value is assigned to a digital asset based on a blockchain technology. Specifically, a non-fungible token may be generated by a smart contract written with reference to a rule (e.g., ERC-721 or ERC-1155). The information about the non-fungible token (e.g., ownership) may be recorded in a blockchain, which is a decentralized storage, thus maintaining integrity. The non-fungible token may be generated to include a specific type (or piece) of data, thereby guaranteeing the existence of the specific kind (or piece) of data.

Specifically, the non-fungible token may be a set of information including various pieces of information. In an embodiment, the non-fungible token may include information (e.g., a digital asset uniform resource identifier (URI)) for accessing a digital asset associated with the token, and/or it may include information (e.g., a metadata URI) for accessing metadata of the token. In another embodiment, the non-fungible token may further include the metadata of the token. The digital asset URI associated with the non-fungible token may be an address of a centralized server or a cloud server where the digital asset is stored. Alternatively, the digital asset URI may be a Content Identifier (CID), i.e., a hash value (e.g., of "ipfs.io/ipfs/12345678") of the digital asset stored in a distributed file system (e.g., an InterPlanetary File System (IPFS)) that stores a file in a distributed manner among many devices. In the example where the non-fungible token includes a metadata URI, the metadata URI may be an address of a centralized server or a cloud server where the metadata of the token is stored. Alternatively, the metadata URI may be a hash value of the metadata stored in the IPFS.

In an embodiment, the metadata of the non-fungible token may refer to a set of information including various pieces of information about the token. The metadata may include, for example, one or more of a contract address of the token, identification information (hereinafter, also referred to as an "ID" or a "token identifier") about the token, the type of the blockchain in which the token is recorded, a generation time of the token, and/or a token owner change history. Hereinafter, in the present disclosure, the expression "information included in a non-fungible token" may be understood as the expression "information included (or recorded) in metadata of a non-fungible token"; the information may not be in the non-fungible token per se, but instead may be in a location pointed to by the non-fungible token.

The term "digital asset" used herein may refer to any information that is expressed in a binary form and is available as an asset. A digital asset may be, for example, text, a 2D image, a 3D image, a video, or a polygon graphic. A digital asset may also be a representation or identifier of a physical asset, for example a bag, an accessory, furniture, a vehicle, a building, real estate, a game item, or a digital card. The originality or provenance of the digital asset may be guaranteed by a non-fungible token corresponding to (and representing) the digital asset.

The term "platform" used herein may refer to an environment in which services of the same or similar purposes are integrated and managed to be used for users. This environment may be provided for users by software (e.g., a computer program or an application) operating on hardware (e.g., a server, a client, an input device, an output device, or a network device). Although there may be differences in detailed meaning, a platform may be comprehensively interchangeable with "software," "application," or "solution." In some implementations, a platform may expose an application programming interface (API) (e.g., a network API for network services) for use by external clients or the like. In an embodiment, a space platform may be an environment that integrates various services related to a space. For example, the space platform may provide a community service, a game service, an e-commerce service, a video conference service, a music listening service, or an advertising service for users. In another embodiment, a non-fungible token platform may be an environment that integrates various services related to issuing and managing non-fungible tokens. For example, the non-fungible token platform may provide a transaction service related to non-fungible tokens or a community service based on the non-fungible tokens for users.

Hereinafter, various embodiments will be described with reference to the accompanying drawings. In the accompanying drawings and description of the drawings, the same or substantially equivalent components may be given the same reference numerals. A redundant description of the same or corresponding components may be omitted in the following description of various embodiments, but this does not mean that the components are not included in the embodiments.

FIG. 1 illustrates an environment including devices applicable to one or more embodiments. The environment may include a verification device 110, a user terminal 120, or an external device 130. Each of the devices 110, 120, and 130 applicable to the environment may interact with a specific block of a blockchain 140 through a network. That is, each of the devices 110, 120, and 130 illustrated in FIG. 1 may be a component of a computer network including a blockchain network, and may check the specific block of the blockchain 140. Although the term "device" is used herein, the devices of FIG. 1 are not necessarily limited to physical devices per se. For example, the verification device 110 may be a cloud service which is actually backed by many cooperating physical devices. While "device" is used for conciseness and description, entities that are not strictly individual devices but which have similar functions are encompassed by the term.

Although FIG. 1 shows an example in which one user terminal 120 interacts with the verification device 110, there may be more user terminals. That is, the verification device 110 may interact with one or more user terminals to process access of the one or more users to a space. Further, FIG. 1 merely shows an example embodiment; components may be added or omitted as needed.

The components illustrated in FIG. 1 are now described in more detail.

The verification device 110 may be a server device of a space platform. That is, the verification device 110 may be a server device managed by an operating entity that manages the space platform. The verification device 110 may be part of the infrastructure that provides the space platform, for example, the verification device 110 may have an internal network address in a private network of the space platform and may be communicated with by the user terminal 120, for example, through a gateway (or the like) of the space platform.

The verification device 110 may provide a service for processing space access requests of users and the service may be one of various services that the space platform provides for the users. In some embodiments, the verification device 110 may determine whether the user owns a specific non-fungible token determined to correspond to a specific space, thereby verifying whether the user is authorized to access (i.e., has a right to access) the specific space. In some embodiments, the verification device 110 may interact with the other devices 120 and 130 illustrated in FIG. 1 or may refer to information recorded in the specific block of the blockchain 140, thereby verifying the right to access the space. Specific operations of the verification device 110 for verifying the right of a user to access a space is described with reference to FIG. 6 and subsequent drawings.

The verification device 110 may be configured as one or more computing devices. For example, all functions of the verification device 110 may be configured in a single computing device. In another example, a first function may be configured in a first computing device, and a second function distinct from the first function may be configured in a second computing device distinct from the first computing device. A computing device may be, for example, a desktop computer, a laptop computer, an application server, a proxy server, a virtual machine, or a cloud server but is not limited thereto, and all types of devices having a computing function may be included in the computing device.

The user terminal 120 may be a terminal of a user that uses the space platform or a non-fungible token platform. The user terminal 120 is also referred to herein as a terminal of a user. In an embodiment, an application, e.g., a web browser, may be installed in the user terminal 120. The user may use the application to use the space platform or the non-fungible token platform. The user terminal 120 may be, for example, a desktop computer, a laptop computer, a tablet computer, a wearable device, a kiosk, a smartphone, or the like, but is not limited to these examples, and all types of devices having a computing function may be included in the user terminal 120.

In an embodiment, the user terminal 120 may generate a submission certificate that may be referred to in decentralized identity authentication (DID Auth). To avoid a redundant description, various embodiments of decentralized identity authentication are described with reference to FIGS. 12 to 14.

The external device 130 may be a server device of the non-fungible token platform. That is, the external device 130 may be a server device operated under management of an entity that manages the non-fungible token platform. In some embodiments, a subject of the verification device 110 and a subject of the external device 130 may have a relationship in contract or a relationship in management (e.g., a subsidiary company, a parent company, a related company, a holding company, an affiliate, etc.) for utilizing the on-fungible tokens or operating the space platform. According to this relationship, the verification device 110 and the external device 130 may share resources managed by the respective devices according to achieve a specific condition (e.g., handling a user request).

The external device 130 may assist with processing of the user's access to a space performed in the space platform. In some embodiments, the external device 130 may transmit a list of non-fungible tokens owned by the user to the verification device 110 to achieve a specific condition (e.g., handling a user request). The non-fungible tokens owned by the user may be managed in the non-fungible token platform, which may provide the list thereof.

A first external device 131 included in the external device 130 may process a series of operations related to authentication performed by the non-fungible token platform. A second external device 132 included in the external device 130 may process a series of operations related to a resource of the non-fungible token platform, based on the processing of the first external device 131. Specific operations of the verification device 110 for verifying whether the user is allowed to access the space by interaction between the external device 130 and the verification device 110 is described with reference to FIGS. 9 to 11.

The first external device 131 and the second external device 132 may be configured as different logical units (e.g., software servers) in a single computing device, or they may be configured as one or more computing devices. For example, a computing device may be a desktop computer, a laptop computer, an application server, a proxy server, or a cloud server but is not limited thereto, and any type of device having a computing function may be included in the computing device.

The verification device 110, the user terminal 120, or the external device 130 illustrated in FIG. 1 may communicate through the network. The network may be configured as any type of wired or wireless network, for example, a local area network (LAN), a wide area network (WAN), a mobile radio communication network (MRCN), and a wireless broadband (WiBro), a cellular network, the Internet (or portions thereof), etc.

Figure 2:
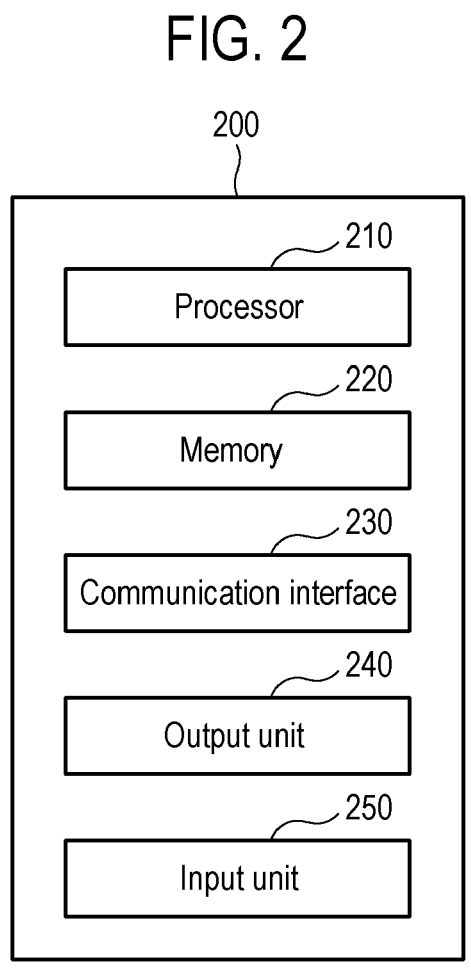
FIG. 2 illustrates a computing device according to one or more embodiments.

FIG. 2 illustrates an example computing device 200 for configuring devices according to embodiments of the present disclosure. The example computing device 200 may be interchangeably referred to herein as an electronic device. The verification device 110, the user terminal 120, or the external device 130 described above with reference to FIG. 1 may be configured as instances of the example computing device 200.

The computing device 200 may include one or more processors 210, one or more memories 220, a communication interface 230, an output unit 240, or an input unit 250. In an embodiment, some components may be deleted from the computing device 200, or other components may be added to the computing device 200. Additionally or alternatively, some components may be configured in an integrated manner, or may be configured as a single entity or a plurality of entities. In the present disclosure, the one or more processors 210 may be referred to as a processor 210. The term "processor" 210 may refer to a set of one or more processors unless clearly indicated otherwise in the context. memory 220 may be one or more of varying types of memory/storage device. That is, the term "memory" as used here refer to a set of one or more memories unless clearly indicated otherwise in the context.

The processor 210 may perform control of each component of the computing device 200 or calculation or information processing related to communication. Specifically, the processor 210 may control at least one component of the computing device 200 connected to the processor 210 by driving software/instructions (or a computer program) received from a different component. For example, the processor 210 may load a command (e.g., an instruction, a code, or a code segment) or information into the memory 220, may process a command or information stored in the memory 220, and may store information resulting from processing in the memory 220. Further, the processor 210 may be connected to components of the computing device 200 to perform an operation, such as various types of calculations, processing, and generation or processing related to the present disclosure.

The memory 220 may store various pieces of information. The information stored in the memory 220 may be information obtained, processed, or used by at least one component of the computing device 200, and may include software in the form of instructions executable by the processor 210. The software may include one or more commands that, when loaded into the memory 220, cause the processor 210 to perform an operation according to various embodiments of the present disclosure. That is, the processor 210 may perform operations according to various embodiments of the present disclosure by executing the foregoing one or more commands. The memory 220 may include, for example, a volatile or nonvolatile memory (but not a signal per se). In an embodiment, a program may be software/instructions stored in the memory 220, and may include an operating system for controlling a resource of the computing device 200, an application, or middleware providing various functions to the application so that the application may utilize resources of the computing device 200.

The communication interface 230 may establish a wired or wireless communication channel with a different device, and may transmit and receive various pieces of information to and from the different device. In an embodiment, the communication interface 230 may include at least one port for connecting with different devices via a wired cable to communicate with the different devices by wire. In this case, the communication interface 230 may communicate with the different devices connected by wire through the at least one port. In an embodiment, the communication interface 230 may be configured to include a cellular communication module to connect to a cellular network (e.g., 3G, LTE, 5G, WiBro, or WiMax). In an embodiment, the communication interface 230 may include a short-range communication module to transmit and receive information to and from the different device by using short-range communication (e.g., Wi-Fi, Bluetooth, Bluetooth Low Energy (BLE), or UWB). In an embodiment, the communication interface 230 may include a contactless communication module for contactless communication. The contactless communication may include at least one contactless short-range communication technology, for example, near-field communication (NFC), radio-frequency identification (RFID) communication, or magnetic secure transmission (MST) communication. In addition to the foregoing various examples, the computing device 200 may be configured in various known methods for communicating with the different device, and the scope of the present disclosure is not limited by the foregoing examples.

The output unit 240 may output a result of the computing device 200 to the outside. The output unit 240 may include, for example, a display, a speaker, a printer, a plotter, etc.

In an embodiment, the computing device 200 may include a display. The display may display various screens, based on control of the processor 210. For example, the display may display a screen to which various interfaces (e.g., a GUI) of a space platform or a non-fungible token platform are applied, based on control of the processor 210. To display the screen to which the various interfaces are applied on the display, for example, a web browser or a dedicated application may be installed in the computing device 200. The display may be a component capable of interacting with a user, and may obtain a user input from the user. The display may be configured in a form of a touch sensor panel (TSP) capable of recognizing contact with or proximity of various external objects (e.g., a finger of the user, an electronic pen, or a stylus). Further, the display may display various types of content (e.g., text, an image, a video, an icon, or a symbol) to be provided to the user.

The input unit 250 may obtain information to be used for a component of the computing device 200 from the outside of the computing device 200. The input unit 250 may include, for example, a mouse, a joystick, a keyboard, a steering wheel, or a hardware button. An external input that the input unit 250 may obtain may include, for example, a touch with a body part of the user, a gesture of the user, proximity of a body part of the user, or a hovering input.

The processor 210, the memory 220, the communication interface 230, the output unit 240, or the input unit 250 illustrated in FIG. 2 may be connected to each other via a bus, a general-purpose input/output (GPIO), a serial peripheral interface (SPI), or a mobile industry processor interface (MIPI) to exchange information or a signal.

Figure 3:
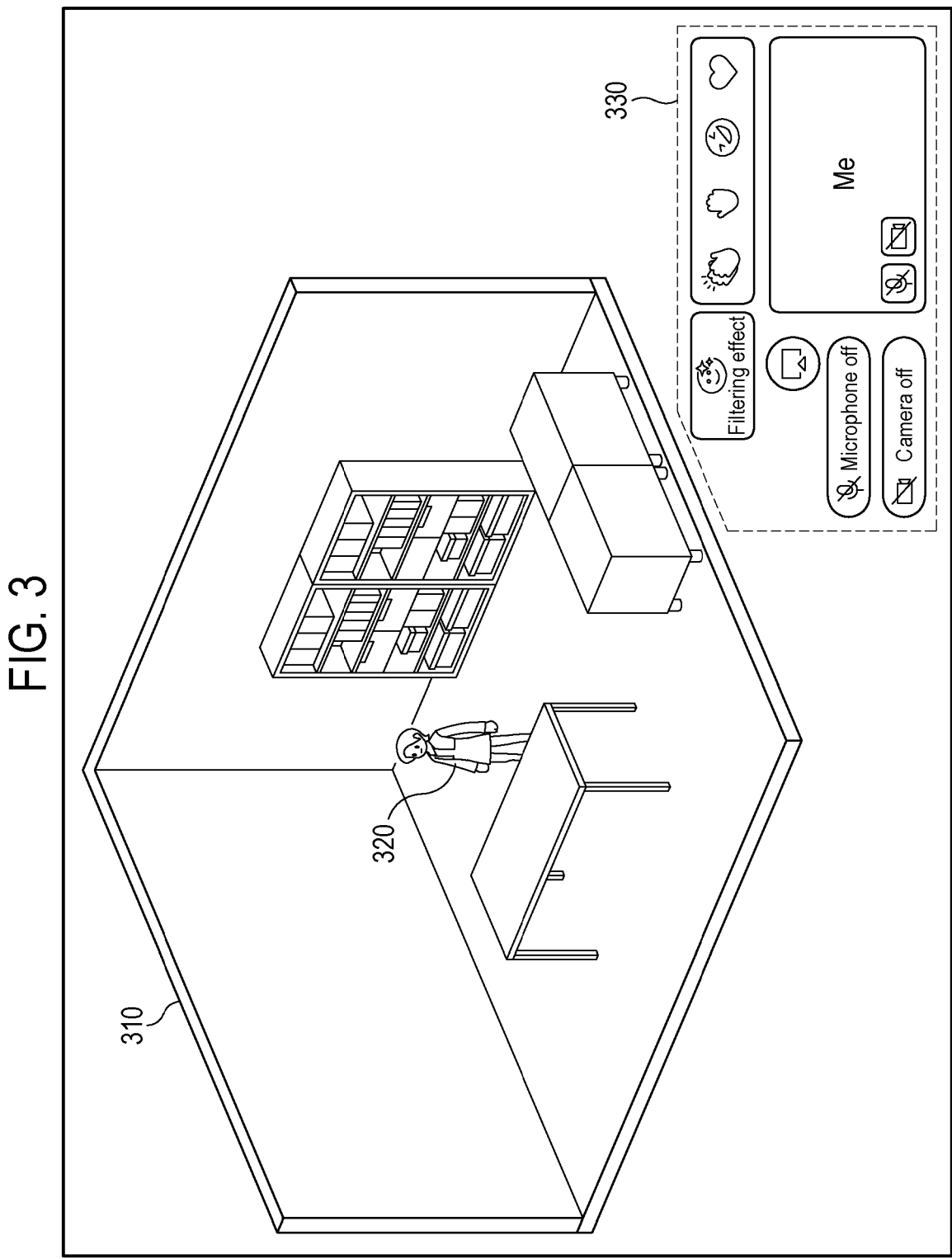
FIG. 3 illustrates an example space according to one or more embodiments.
Figure 4:
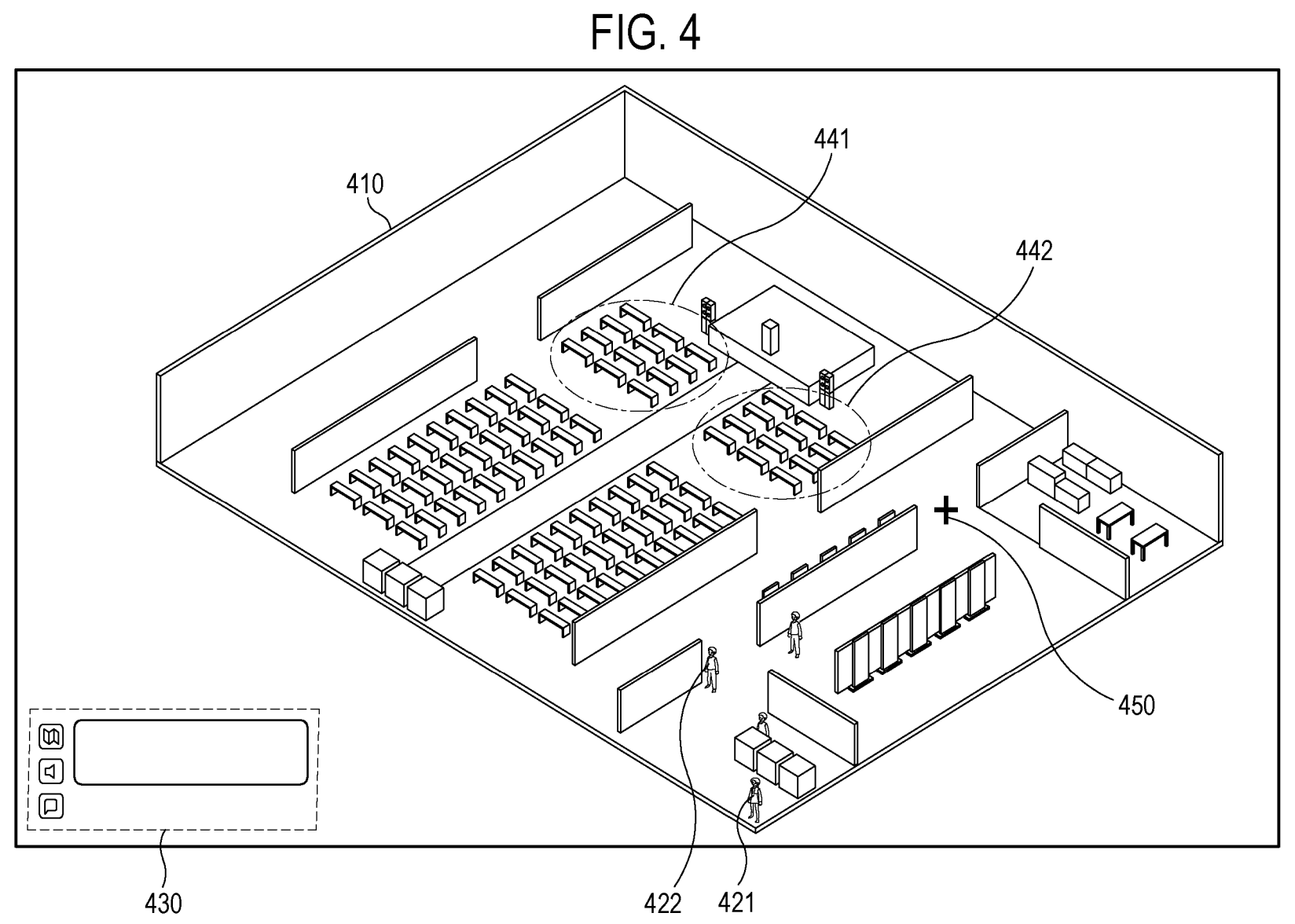

A space and a non-fungible token for reference in various embodiments are described next. FIG. 3 and FIG. 4 illustrate example spaces according to one or more embodiments.

The spaces 310 and 410 illustrated in FIG. 3 and FIG. 4 may be a type of virtual space that may be provided to a user terminal 120. For example, the virtual space may be a virtual reality or an augmented reality. A screen of the virtual space may include a user interface and may be displayable on a display of the user terminal 120. The user interface may include a rendering of the virtual space. The user interface of the virtual space may provide the user terminal 120 with an output related to an input of a user received from an input device of the user terminal 120.

Regarding display of the spaces 310 and 410, for example, a verification device 110 may transmit to the user terminal 120 a link (e.g., a URL or URI) for displaying the space 310 or the space 410. The user terminal 120 may display the space 310 or the space 410 on the display of the user terminal 120 by accessing the link. In some embodiments, displaying the link on the user terminal 120 may be omitted. For example, the verification device 110 may store, in advance in its memory, a link that points to a space.

Regarding a configuration of the spaces 310 and 410, in an embodiment, the size of the spaces 310 and 410, a component (e.g., an interactive object, such as a non-player character (NPC), or furniture) included in the spaces 310 and 410, or a service set provided in the spaces 310 and 410 may be configured according to an operating intent of an entity operating the space platform. The service set provided in the spaces 310 and 410 may refer to a set of various services including, for example, a community service, a game service, an e-commerce service, a video conference service, a music listening service, or an advertising service. Such services may be invoked by a user when interacting with the space. In some spaces, which services are available may depend on a portion of the space where an avatar of the is present within the space.

Regarding the configuration of the spaces 310 and 410, in another embodiment, the size of the spaces 310 and 410, components (or objects) included in the spaces 310 and 410, or a service set provided in the spaces 310 and 410 may be customized according to an intent of the user in the space platform. Depending on the configuration of the spaces 310 and 410, the spaces 310 and 410 and an interface related to the configuration of the spaces 310 and 410 may be provided to the user terminal 120. For example, referring to FIG. 3, as a video conference service is configured to be provided in the space 310, an interface 330 related to the video conference service may be displayed together with the space 310 on the display of the user terminal 120. In some implementations, access to the service may depend on the user accessing specific portion or area of the space, and such access may be regulated with the use of non-fungible tokens. In another example, referring to FIG. 4, as a community service is configured to be provided in the space 410, an interface 430 related to the community service may be displayed together with the space 410 on the display of the user terminal 120.

The spaces 310 and 410 may include one or more areas. For example, referring to FIG. 4, the space 410 may include a plurality of areas including a first area 441 and a second area 442. In an embodiment, the first area 441 and the second area 442, which are distinguished from each other, may be areas that are accessible according to a right to access mutually distinguished areas (e.g., an area access right). For example, a first user having a first area access right may be allowed to access the first area 441, and, lacking sufficient access right for the second area 442, may not be allowed to access the second area 442. A second user having a second area access right, based thereon, may be allowed to access the second area 442 and may not be allowed to access the first area 441.

The spaces 310 and 410 may include objects 320, 421, and 422 corresponding to and representing users. The objects 320, 421, and 422 corresponding to the user may be a type of player character (PC), and may be objects that may be played or manipulated by users. In addition, the spaces 310 and 410 may include interactive objects. The interactive objects may be a type of NPC (autonomously acting objects), and may be objects that may not be played or manipulated by the user but are capable of interacting with the objects 320, 421, and 422 corresponding to the users.

The spaces 310 and 410 may be configured such that the objects 320, 421, and 422 corresponding to the user are movable. That is, the objects 320, 421, and 422 corresponding to the user may move in the spaces 310 and 410 according to an intent of the user, and a movement of the object 320, 421, and 422 may be displayed on the display of the user terminal 120. The intent of the user may refer to, for example, an input to the user terminal 120 via the input device, such as a touch panel, a mouse, or a keyboard, a video gesture recognition system, etc.

Regarding the movement of the objects 320, 421, and 422, in an embodiment, the movement of the objects 320, 421, and 422 may be allowed or may not be allowed according to the area access right. For example, it is assumed that the first user having the first area access right may be allowed to access the first area 441 and may not be allowed to access the second area 442. In this case, a first object corresponding to (representing) the first user may be allowed to access the first area 441 or to move therein, and may not be allowed to access the second area 442 or to move therein. Further, it is assumed that the second user having the second area access right may be allowed to access the second area 442 and may not be allowed to access the first area 441. In this case, a second object corresponding to (representing) the second user may be allowed to access the second area 442 or to move therein, and may not be allowed to access the first area 441 or to move therein.

Regarding a service set of an area included in the spaces 310 and 410, in an embodiment, a first service set provided for the first user accessing the first area 441 and a second service set provided for the second user accessing the second area 442 may be distinguished. For example, the first service set may include a community service, while the second service set may not include the community service. In another example, the first service set may include a first interactive object configured to be able to interact with the objects 320, 421, and 422, while the second service set may include a second interactive object distinguished from the first interactive object. In other words, service sets provided in the areas may be different depending on the areas.

The entity operating the space platform may provide, in a specific area of the space, a premium service including a set of services preferred by the user. In an embodiment, to use the premium service, the user needs to satisfy a premium service use condition. The use condition may mean obtaining an area access right to access the specific area. For example, to access the specific area where the premium service is provided, the area access right may be obtained by proving ownership of a specific number or more of non-fungible tokens or proving ownership of a non-fungible token of a specific price or higher. Any property of a non-fungible token or the information (metadata) that it might point to may be used to determine whether to grant access to a specific area.

Regarding a request for access to the specific area, in an embodiment, when the objects 421 and 422 corresponding to the user are located at a specific point 450 included in the space 410, a series of processes of verifying an area access right may start. Such a verification process may be automatically triggered based on a determination by the space platform that the location of one of the objects (moving) has reached or intersected with the specific area. The specific point 450 may be, for example, an entrance or passage of a specific space or a point where an object, such as a door or switch, is located, a perimeter of the specific area, etc. In another embodiment, when the objects 421 and 422 corresponding to the user perform a specific operation in the space 410, a series of processes of verifying an area access right may start with respect to the user and the specific area. The specific operation may be an operation of the objects 421 and 422 corresponding to the user preset for an input of the user (obtained via the input device of the user terminal 120), and may be, for example, an operation of displaying a specific message or an operation of performing a specific movement.

Figure 5:
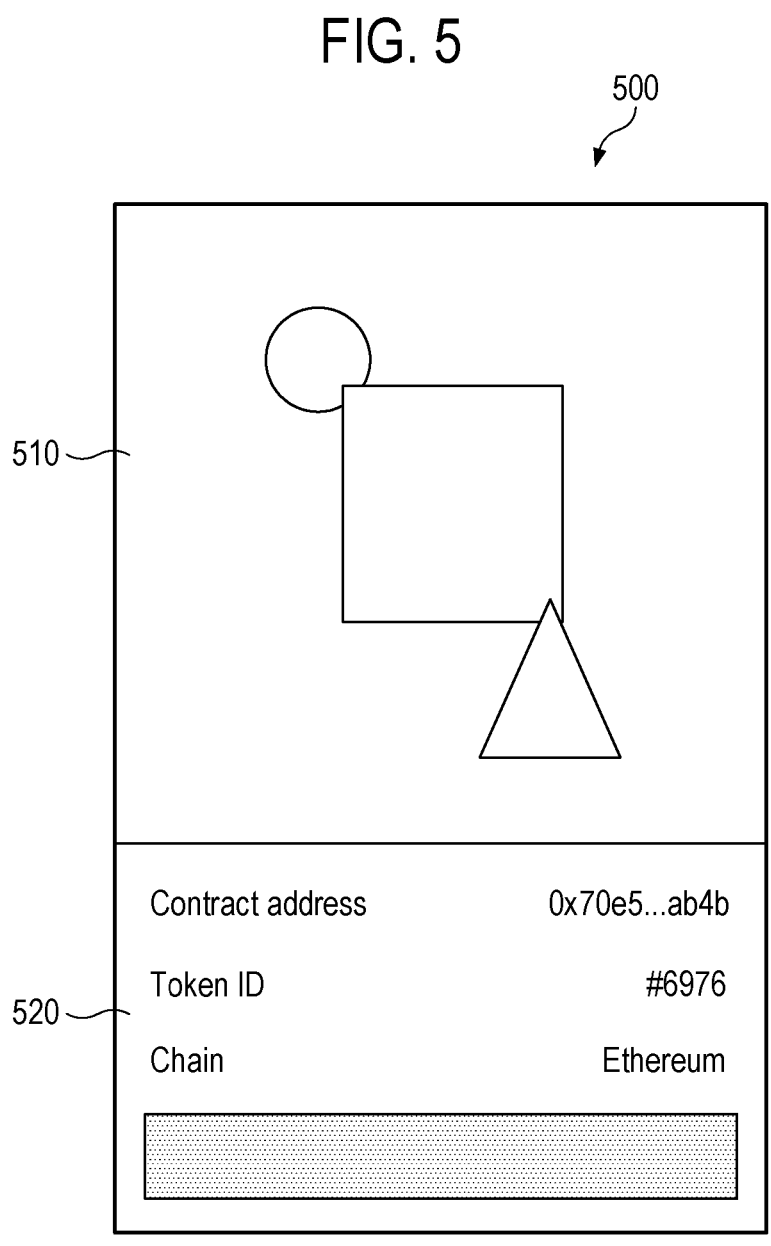
FIG. 5 illustrates an example non-fungible token according to one or more embodiments.

FIG. 5 illustrates an example non-fungible token 500, according to one or more embodiments. FIG. 5 shows a graphic representation of the non-fungible token 500, which may be displayed on a display of the user terminal 120 or elsewhere. The non-fungible token 500 may be generated based on at least part of a set of information recorded in a block of a blockchain. That is, the non-fungible token 500 may be a form recognizable through a screen displayed on the user terminal 120 of a user that has accessed a space platform or a non-fungible token platform. As illustrated in FIG. 5, the non-fungible token 500 may include a digital asset 510 and metadata 520. The digital asset 510 or the metadata 520 of the non-fungible token 500 may be referenced in an operation of determining ownership of the non-fungible token 500 according to various embodiments described below. The non-fungible token may be structured or configured to conform with any of various standards that specify properties of non-fungible tokens. For example, the non-fungible token 500 may conform to the ERC-721 standard or the ERC-1155 standard.

Each step of the methods to be described with reference to the following drawings may be performed by a computing device. In other words, each step of the methods may be configured as one or more instructions executed by a processor of the computing device. All steps included in the methods may be executed by one physical computing device, but some steps of the methods may be performed by a first computing device and other steps of the methods may be performed by a second computing device. Hereinafter, unless indicated otherwise in the context, a description will be made assuming that each step of the methods is performed by the verification device 110 illustrated in FIG. 1. However, for convenience of description, a description of an operating entity of each step is omitted.

Figure 6:
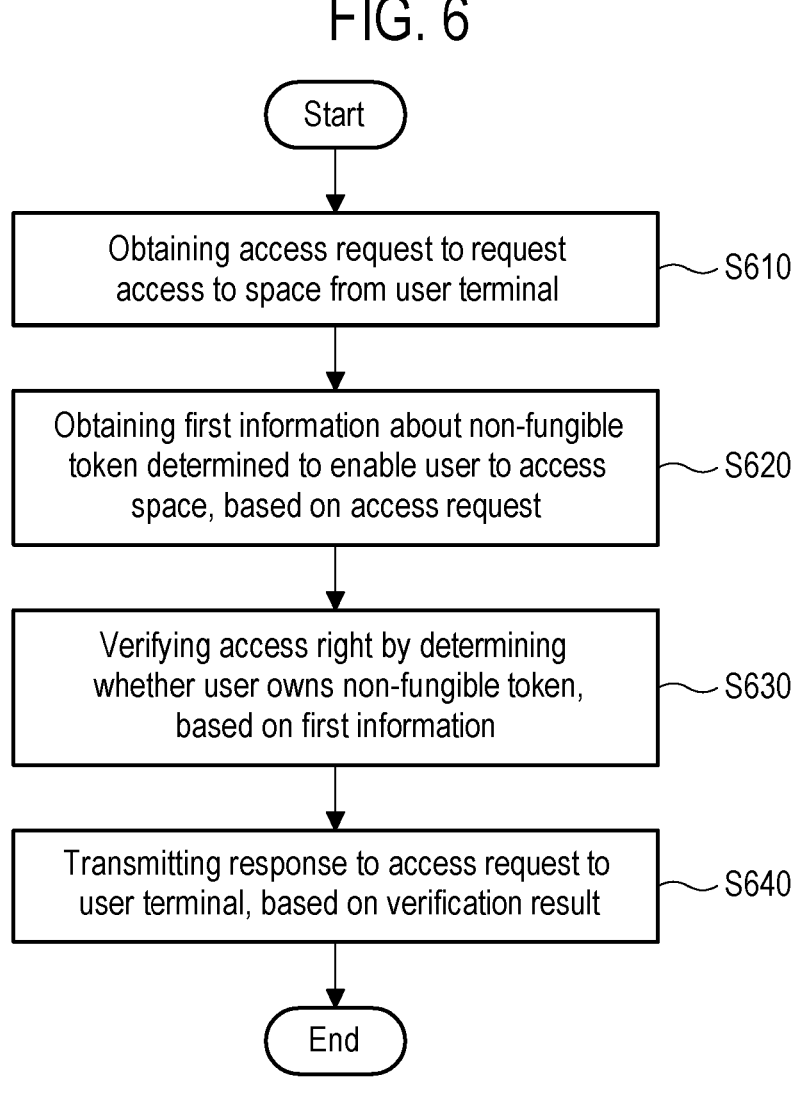
FIG. 6 illustrates a method according to one or more embodiments.

FIG. 6 illustrates a method according to one or more embodiments. The method illustrated in FIG. 6 relates to a series of operations starting from an operation (S610) of obtaining an access request from a user requesting access to a virtual space to an operation (S640) of transmitting a response to the access request to the user terminal 120. In the series of operations illustrated in FIG. 6, a non-fungible token may be used as a form of admission ticket for verifying a right to access the virtual space (or a specific portion or area thereof).

A processor connected to a computer network including a blockchain network may obtain the access request to request access to at least a portion of the virtual space including a plurality of areas from the terminal of the user (S610). According to some embodiments, the access request may be an information message including information for requesting access to the virtual space.

Specifically, the verification device 110 may obtain the access request from the user terminal 120 in various ways. For example, when the user selects a specific button displayed on the user terminal 120 that has accessed a space platform, the verification device 110 may obtain a request to access a specific virtual space related to the specific button. In another example, when an object of the user displayed on the user terminal 120 that has accessed the space platform is determined to be located at a specific point in a first virtual space for which access verification is required, the verification device 110 may obtain a request to access a different second virtual space determined to correspond to the specific point. In some examples, in the latter case, if may be the space platform that generates the access request. An access request may also be obtained from the space platform, which may issue an access request in response to user interactions with the space platform via the user terminal 120 (e.g., in response to the user manipulating an object or avatar to a point that triggers an access permission check).

When the virtual space includes multiple areas, in an embodiment, the operation of obtaining the access request (S610) may include an operation of obtaining an area access request to request access to at least one of the areas. According to another embodiment, the area access request may be an information message including information for requesting access to one of the areas included in the virtual space. Since the access request and the area access request are different only in an object being requested to be accessed, techniques related to the operation of obtaining the access request (S610) and techniques related to the operation of obtaining the area access request may be interchangeably applied.

Regarding the operation of obtaining the area access request (S610), in some embodiments, the operation of obtaining the area access request (S610) may include obtaining the area access request when an object corresponding to the user is located at a specific point included in the virtual space, as described with reference to FIGS. 3 and 4.

The processor connected to the computer network including the blockchain network may obtain, based on the access request (620), first information configured to be used to determine if the user (and/or the object corresponding to the user) is authorized to access the portion. The first information about the non-fungible token may be a type of access rule for the virtual space, and may be information against which the second information (about a non-fungible token owned by the user) is checked to determine whether access is authorized. In other words, the first information may specify (as described below) a condition that needs to be filled by the requesting user's non-fungible token(s) and the second information may be information of the user's non-fungible token(s), which can be compared to the first information to determine if the second information satisfies the first information (which may be, e.g., a rule, a Boolean expression, etc.).

Specifically, the verification device 110 may determine the first information to correspond to the virtual space (or portion thereof) in advance (i.e., the first information may be pre-associated with the virtual space or portion/area thereof), and may store the first information in a memory in association with the virtual space (or portion/area thereof). In addition, when receiving the access request from the user terminal 120 (or elsewhere), the verification device 110 may identify the virtual space (or portion/area thereof) corresponding to the access request. The verification device 110 may obtain the first information corresponding to the virtual space (or portion thereof) from the memory based on its pre-association with the virtual space (or portion/area thereof); the access request may include an identifier of the virtual space and/or portion or space thereof (or such identifier may be associated with the access request as part of a multi-part transaction). As discussed next, the first information may include other information that is not about non-fungible tokens, e.g., information about the associated virtual space. In the present disclosure, the expression "access of a user" may be interchangeably referred to as the expression "access of an object corresponding to a user" unless stated otherwise in the context.

Regarding the first information, in some embodiments, the first information may include one or more verification items (also referred to as a "first item") for determining whether the user is authorized to access the virtual space (or portion/area thereof) and one or more values corresponding to the verification items. In some embodiments, the one or more verification items may include an item that is a list of non-fungible tokens (hereinafter referred to as a "first list"). The list may include one or more items about one or more non-fungible tokens included in the list. For example, the one or more items may include a token identifier of a non-fungible token, metadata of a non-fungible token, a contract address of a non-fungible token, the number of non-fungible tokens, a price/value of a non-fungible token, a market in which a non-fungible token is traded, a wallet address of a non-fungible token, and/or a digital asset of a non-fungible token. In some embodiments, the one or more verification items may include an item about a virtual space. The item about the virtual space may include one or more items (pieces of information) about the virtual space. For example, the one or more items about the virtual space may indicate/identify a type of the virtual space, an area of the virtual space, a service set activated in the virtual space (and/or area), and/or a virtual space identifier for identifying the virtual space. In some embodiments, the one or more verification items may include an item about an event. The item about the event may include one or more items about an event happening in a virtual space (or portion/area thereof). For example, the one or more items may indicate the type of the event, a period of the event, or an organizer of the event. A specific operation of determining ownership of the non-fungible token by using the first information is described below with reference to an operation of verifying an access right (S630).

When the virtual space includes multiple areas, in some embodiments, the operation of obtaining the first information (S620) may include obtaining information for determining whether one of the areas is accessible based on the area access request (i.e., an area access rule). That is, the area access rule may be for determining whether the one of the areas is accessible by the user (or the object corresponding to the user), i.e., whether the user is authorized to access the one of the areas. Since the "access rule" (i.e., the first information) and the "area access rule" are different with respect to an object for which access is being requested, techniques related to the operation of obtaining the first information (S620) and techniques related to the operation of obtaining the area access rule may be interchangeably applied.

The processor connected to the computer network including the blockchain network may determine, based on the first information, whether the user owns a suitable non-fungible token, thereby verifying an access right indicating whether the portion/area is accessible to the user (S630), i.e., whether the user is authorized to access the area of the virtual space. Such information may be requested of the blockchain network, e.g., directly, or indirectly via an external device 130 (which may in turn communicate with the blockchain network).

Specifically, the verification device 110 may compare a value of the one or more verification items included in the first information with one or more pieces of information (i.e., one or more values of second item(s) of the second information) about the non-fungible token owned by the user, thereby determining whether the user owns a non-fungible token corresponding to (i.e., suitable to authorize access to) the virtual space to which the access is requested.

Further, the verification device 110 may verify the access right according to a determination result. For example, a verification item included in first information (corresponding to a first virtual space) may be determined as an item about a contract address (of a smart contract) and a value of the verification item is determined as {0x77e}. In this case, when a contract address of the non-fungible token owned by the user is {0x77e}, the user may be verified to have a right to access the first virtual space. When the contract address of the non-fungible token owned by the user is not {0x77e}, the user may be verified not to have the right to access the first virtual space. Similarly, the verification item may be a list of contract addresses, which may function as an access control list; when the user's non-fungible token has a contract address matching any in the of contract addresses then the user is authorized.

In another example, a verification item included in first information corresponding to a second virtual space (or area thereof, or an area of the first virtual space) may be determined as a plurality of items, for example, about contract addresses and a value of the verification item is determined as {0x77e; 0e663}. The first information is a rule for determining whether the user owns two non-fungible tokens with respective contract addresses of {0x77e} and {0e663}. In this case, when a contract address of a first non-fungible token owned by the user is {0x77e} and a contract address of a second non-fungible token owned by the user is {0e663}, the user may be verified to have a right (authorization) to access the second virtual space. When there is a contract address in the verification item (e.g., {0x77e}) for which the user does not a non-fungible token with that contract address of {0x77e}, e.g., the user only has a non-fungible token with the contract address of {0e663}, the user may be verified not to have the right to access the second virtual space.

In still another example, a verification item included in first information corresponding to a third virtual space (or an area thereof, or an area of the first or second virtual space) may be determined as (i) an item about a token identifier and (ii) an item about a price and/or a value of the verification item is determined as {#0 or greater and #500 or less; 0.5 ETH or greater}. In this case, when a token identifier of the non-fungible token owned by the user is a number that is #0 or greater and #500 or less and a price of the non-fungible token is 0.5 ETH or greater, the user may be verified to have a right to access the third virtual space. When the token identifier of the non-fungible token owned by the user is a number greater than #500 or the price of the non-fungible token is less than 0.5 ETH, the user may be verified not to have the right to access the third virtual space.

Although not specifically illustrated above, it is possible to determine the first information to include one or more verification items and one or more values corresponding to the verification items in a manner similar to the above example, and it is possible to determine whether the user owns a non-fungible token that satisfies the first information. That is to say, possession/ownership of one or more non-fungible tokens with any variety of combination of properties, and/or properties associated with or pointed to by a non-fungible token, may be used as a condition for determining whether a user (an identity/object/avatar etc. representing the user) is authorized to access a virtual space or an area thereof. The requirements for authorization may be formulated, for example, as arbitrary Boolean expressions of non-fungible token properties (generally obtainable from the tokens themselves or from a service such as a blockchain network, a service implementing contracts, etc.), lists of items to be verified, etc.

Regarding the operation of verifying the access right, in some embodiments, the operation of verifying the access right may include an operation of determining whether a contract address (of a smart contract) of the non-fungible token owned by the user as the value of the second item of the second information corresponds to the contract address (a value of the first item) included in the first information. In another embodiment, the operation of verifying the access right may include an operation of determining whether the user owns a first non-fungible token and a second non-fungible token related to the first information.

When the virtual space includes multiple areas, in some embodiments, the operation of verifying the access right (S630) may include an operation of verifying an area access right indicating whether one of the areas is accessible by the user by determining whether the user owns a non-tangible token satisfying the area access rule for that area. Since the access right and the area access right are different only in the type of object of the right, techniques related to the operation of verifying the access right (S630) and techniques related to the operation of verifying the area access right may be interchangeably applied.

The processor connected to the computer network including the blockchain network may transmit the response to the access request to the terminal of the user (or to the space platform providing the virtual space) based on a result of verifying the access right (S640). Specifically, for example, when the access right of the user is verified, the verification device 110 may transmit a link of the virtual space (as the response to the access request) to the terminal of the user.

When the access right of the user is not verified, the verification device 110 may transmit an error message as the response to the access request to the terminal of the user (or to the space platform).

Regarding the operation of transmitting the response (S640), in an embodiment, the operation of transmitting the response (S640) may include an operation of transmitting a response that a first service set is activated when the object corresponding to the user accesses a first area included in the virtual space and a second service set distinguished from the first service set is activated when the object corresponding to the user accesses a second area distinguished from the first area to the user terminal 120. In other words, the set of services activated may depend on which area is accessed. Related detailed description may be understood by referring to the description of FIG. 3 and FIG. 4.

When the virtual space includes multiple areas, the operation of transmitting the response (S640) may include an operation of transmitting a response to the area access request to the terminal of the user, based on a result of verifying the area access right. Here, the response to the area access request may be a link of the area or an error message. Since the response to the access request and the response to the area access request differ only with respect to an object of a link when the rights are verified, techniques related to the operation of transmitting the response to the access request (S640) and techniques related to the operation of transmitting the response to the area access request may be interchangeably applied.

Figure 7:
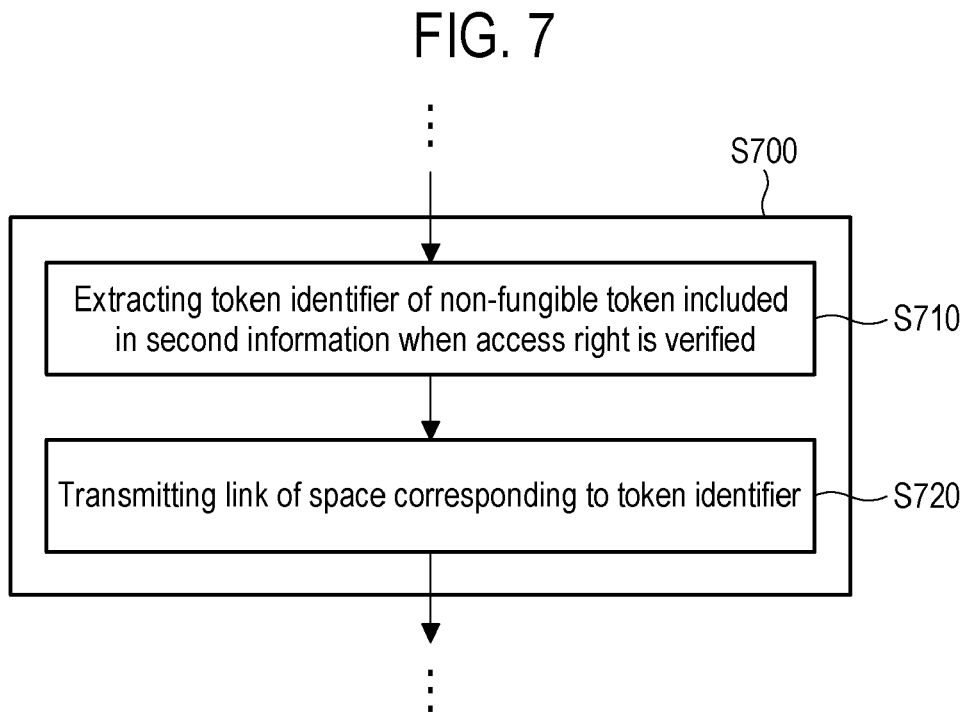
FIG. 7 illustrates an operation of transmitting a response described with reference to FIG. 6, according to one or more embodiments.

FIG. 7 illustrates the operation of transmitting the response (S640) described with reference to FIG. 6. That is, operation S700 of FIG. 7 may correspond to the operation of transmitting the response (S640) of FIG. 6.

When the access right is verified, a token identifier of the non-fungible token included in the second information may be extracted (S710), and the link of the virtual space (or area thereof) corresponding to the token identifier may be transmitted to the terminal of the user (S720). That is, when the access right is verified, the value of the first item of the first information corresponds to the value of the second item of the second information, and thus an item about a token identifier that may be included in the first information and a value corresponding to the item may be used as a virtual space assignment rule in some cases. The virtual space assignment rule may be a rule for assigning the user to one of a plurality of subspaces when there are multiple subspaces associated with the specific virtual space to which access is requested by the user. For example, the subspaces associated with the specific virtual space may be assumed to include a first subspace and a second subspace. Here, the assignment rule is assumed as a rule for assigning the user to the first subspace based on the token identifier when the token identifier is {#0 to #10} and assigning the user to the second subspace when the token identifier is {#11 to #20}. When a token identifier of a non-fungible token owned by a first user is #5, a link of the first subspace may be transmitted to a terminal of the first user. When a token identifier of a non-fungible token owned by a second user is #17, a link of the second subspace may be transmitted to a terminal of the second user.

Regarding the subspaces associated with the specific virtual space, in some embodiments, the subspaces may be areas included in the specific virtual space. In another embodiment, the subspaces may be virtual spaces of different channels of the specific virtual space.

Regarding the assignment rule (e.g., allocation of users amongst subspaces), an item about a token identifier that may be included in the first information and a value corresponding to the item may be used as the assignment rule, but one or more other verification items that may be included in the first information and one or more values corresponding to the items may also, or instead, be used for assigning users to virtual subspaces.

FIG. 8 illustrates a method according to one or more embodiments. The method illustrated in FIG. 8 relates to a series of operations starting from an operation of obtaining a reaccess request from a user requesting reaccess to a virtual space (S810) to an operation of transmitting a response to the reaccess request to the user terminal 120 (S860). According to the series of operations illustrated in FIG. 8, the reaccess to the virtual space may be processed.

The reaccess request to request reaccess to the virtual space may be obtained from the terminal of the user (S810), for example (although other devices, as discussed above with respect access requests, may provide a reaccess request). Since an access request and the reaccess request are different only in whether a request is a first request, a general description of this operation may be understood by referring to the description of the operation (S610) of obtaining the access request in FIG. 6.

A difference between a verification time of an access right corresponding to the access request and a time of the reaccess request may be calculated (S820). Specifically, a verification device 110 may record processing times of operations that are performed. For example, the verification device 110 may obtain the verification time of the access right by recording a processing time of the operation of verifying the access right (S630) in FIG. 6. In another example, the verification device 110 may obtain the time of the reaccess request by recording a processing time of the operation of obtaining the reaccess request (S810). The verification device 110 may subtract the verification time of the access right from the time of the reaccess request. As a result of this subtraction, the amount of time between when verification of the access right is completed and a time when the reaccess request is obtained. However, the calculating of the time difference (S820) is for determining whether verification of a reaccess right is necessary, the amount of time used for such determining may vary, for example, the amount of time may be a difference between a time of the access request and a time of the reaccess request, a difference between a time when first information is obtained and the time of the reaccess request, a difference between a time when the response is transmitted and the time of the reaccess request, or a difference between a time when the user leaves the virtual space and the time of the reaccess request.

Whether the verification of the reaccess right is necessary may be determined based on whether the difference is within a reference period (S830). Specifically, the verification device 110 may determine that the verification of the reaccess right is unnecessary when the difference is below a threshold.

When the verification of the reaccess right is necessary (S840), a verification procedure may be performed (S850), and the response to the reaccess request may be transmitted to the terminal of the user according to the verification procedure (S860). When the verification of the reaccess right is unnecessary (S840), the response to the reaccess request may be transmitted to the terminal of the user (S860) (e.g., as an affirmative authorization). Otherwise, processing of the reaccess request is generally the same as the processing of a first access request, as described above with reference to FIG. 6.

FIG. 9 illustrates a method according to one or more embodiments. The method illustrated in FIG. 9 relates to a series of operations starting from an operation (S910) of obtaining an access request for a user requesting access to a virtual space to an operation (S950) of transmitting a response to the access request to the user terminal 120. In particular, in the method illustrated in FIG. 9, a verification device 110 may interact with an external device 130 related to a non-fungible token platform. In the series of operations illustrated in FIG. 9, a non-fungible token function as a type of admission ticket for verifying a right to access the virtual space.

The access request to request access to the virtual space may be obtained from the terminal of the user (S910). This operation may be understood to be the same as the operation of obtaining the access request (S610) in FIG. 6. In some implementations, the access request may originate from another device, for example from a server device providing the virtual space platform, an intermediary, a proxy, etc.

First information about the non-fungible token determined to enable the user to access the virtual space may be obtained based on the access request (S920). That is, the first information may be configured for being checked against to determine whether users are authorized to access the virtual space (or an area thereof). This operation may be understood to be generally the same as the operation of obtaining the first information (S620) in FIG. 6.

Second information about a non-fungible token (or tokens) owned by the user may be obtained from the external device 130 related to the non-fungible token platform (S930). The second information about the non-fungible token may be information about the non-fungible token(s) owned by the user, and may include, for example, an item (i.e., a second item) corresponding to a first item included in the first information and a value of the item.

Specifically, the verification device 110 may transmit a request for the second information to the external device 130, and in response the external device 130 may transmit back the second information about the non-fungible token owned by the user1.

Whether the user owns a non-fungible token sufficient to be granted access to the virtual space may be determined based on the first information and the second information, thereby verifying an access right (S940). This operation is different from the operation of verifying the access right (S630) in FIG. 6 in that the second information is obtained from the external device 130; otherwise, the verifying is similar to the operation of verifying the access right (S630) in FIG. 6.

The response to the access request may be transmitted to the terminal of the user, based on a result of verifying the access right (S950). This operation may be understood to be generally the same as the operation of transmitting the response (S640) in FIG. 6.

Figure 10:
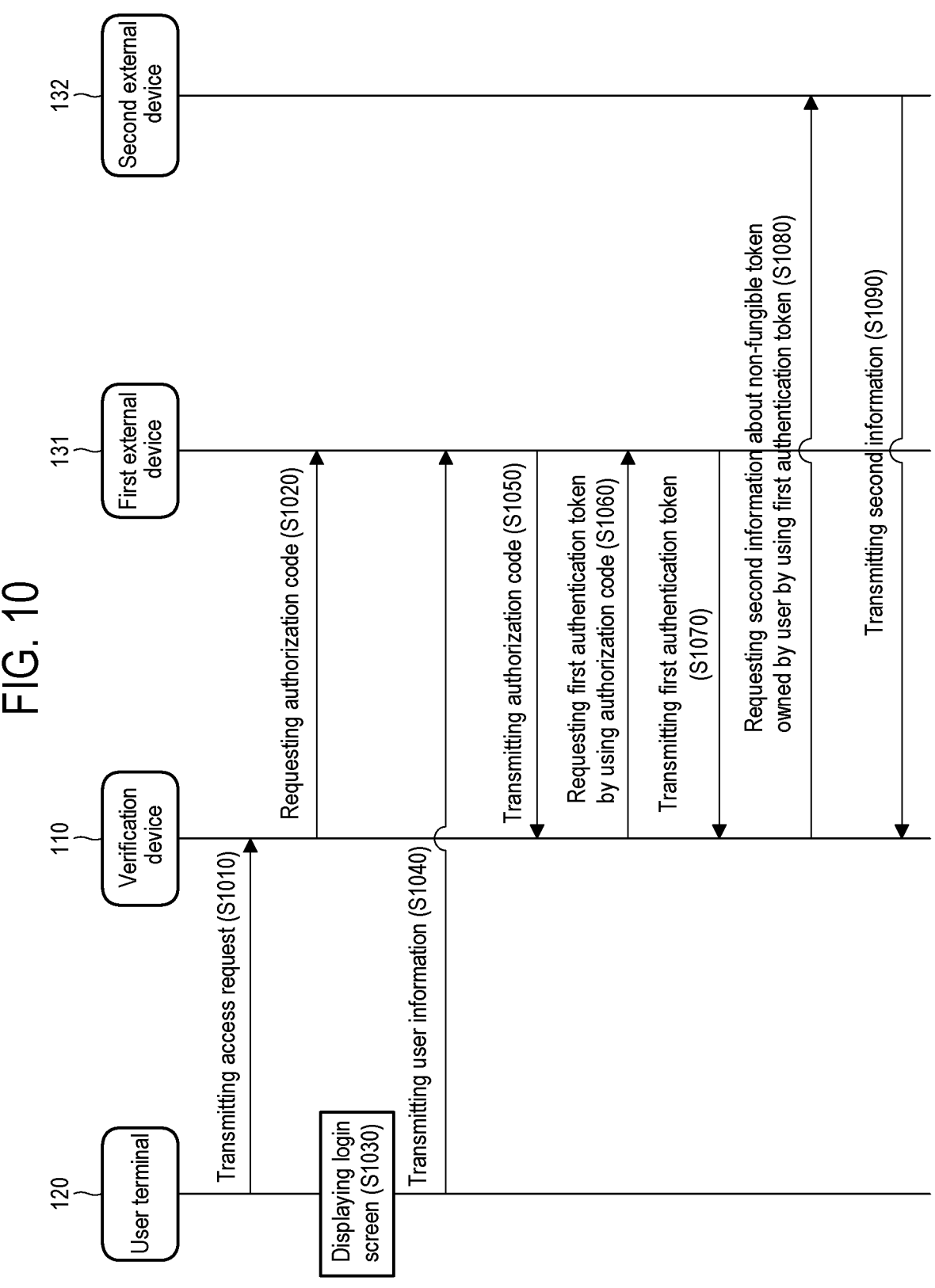
FIG. 10 illustrates an operation of obtaining a list of non-fungible tokens described with reference to FIG. 9, according to one or more embodiments.

FIG. 10 illustrates a detailed operation of obtaining the second information (S930) described with reference to FIG. 9. The method illustrated in FIG. 10 may involve a verification device 110 interacting with a first external device 131 and a second external device 132 included in an external device 130, and may be understood, for example, by referring to a description of an OAuth 2.0 protocol, for example. The OAuth 2.0 protocol specifies a method in which an authorization server entrusts a right to access a resource provided by a resource server to a client server. Here, the client server may be an entity that transmits a request for an authorization code to the authorization server to use a resource of a user. The authorization server may be a server that performs authentication or authorization, and may be an entity that verifies qualification of the client server and issues an authentication token (e.g., an access token). The resource server may be an entity that stores information (i.e., a resource) of the user.

In the present disclosure, the client server may be the verification device 110, the authorization server may be the first external device 131, and the resource server may be the second external device 132.

A user terminal 120 may transmit an access request to the verification device 110 (S1010). This operation may be generally the same as the operation of obtaining the access request (S610) in FIG. 6.

The verification device 110 may transmit a request for an authorization code to the first external device 131 related to authentication of a non-fungible token platform (S1020). Here, the authorization code may be a code used when the verification device 110 requests access to a specific resource (e.g., second information) instead of the user terminal 120.

The user terminal 120 may display a login screen on a display (S1030). Specifically, when the request for the authorization code is transmitted to the first external device 131, the login screen (as a space platform screen or user interface) provided by the verification device 110 to the user terminal 120 may be displayed on the display of the user terminal 120. The login screen may be a login screen of/for the non-fungible token platform related to the first external device 131.

The user terminal 120 may transmit user information to the first external device 131 (S1040). The user information may be a user ID inputted and a password corresponding to the user ID, both inputted via the login screen. That is, the user information may be directly transmitted to the first external device 131, not via the verification device 110.

The first external device 131 may transmit the authorization code to the verification device 110 (S1050). Specifically, the first external device 131 may determine whether to transmit the authorization code to the verification device 110 upon verifying the user information transmitted from the user terminal 120. For example, when the user information is legitimate (login credentials are verified), the first external device 131 may transmit the authorization code to the verification device 110, and when the user information is not legitimate, the first external device 131 may not transmit the authorization code to the verification device 110.

The verification device 110 may transmit a request for a first authentication token to the first external device 131 by using the authorization code (S1060), and the first external device 131 may transmit the first authentication token to the verification device 110 (S1070). The first authentication token, that is, an access token, may refer to a token used when information is obtained from the second external device 132 related to a resource of the non-fungible token platform. That is, the authorization code may be exchanged for the first authentication token through an API provided by the first external device 131, and the first authentication token may be transmitted to the verification device 110 for further use thereby.

The verification device 110 may transmit a request for the second information to the second external device 132 by using the first authentication token (S1080), and the second external device 132 may transmit the second information to the verification device 110 (S1090) by authenticating the first authentication token (e.g., through a separate token authority).

According to the method illustrated in FIG. 10, the user may entrust a right to access a resource (e.g., the second information) of the non-fungible token platform to the verification device 110 related to a space platform.

Figure 11:
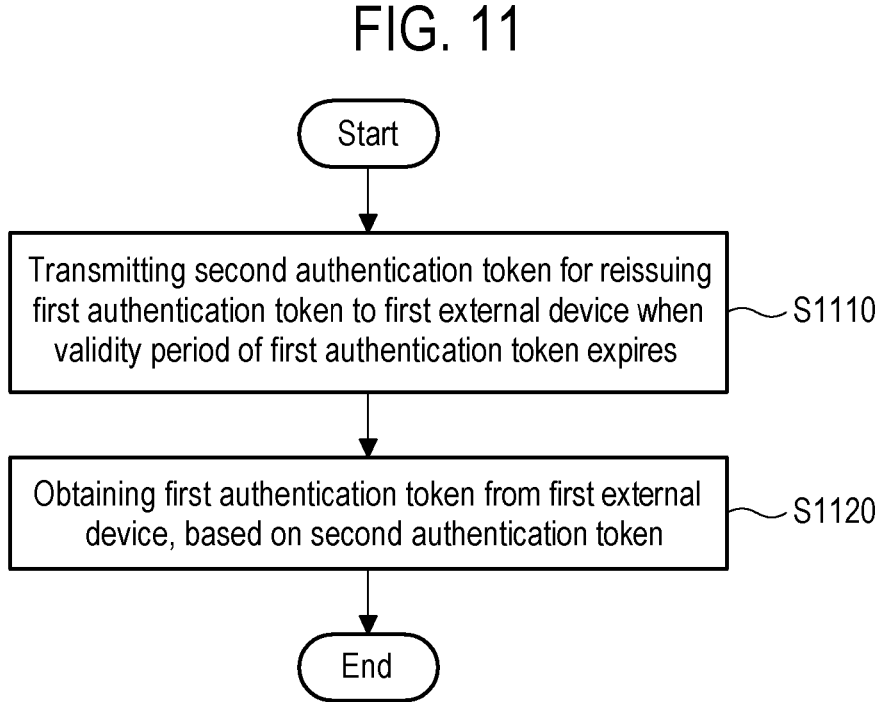
FIG. 11 illustrates a method according to one or more embodiments.

FIG. 11 illustrates a method according to one or more embodiments. The method illustrated in FIG. 11 may involve a verification device 110 being reissued the first authentication token (described with reference to FIG. 10) from a first external device 131 when the first authentication token expires, and may be understood, for example, by referring to the description of the OAuth 2.0 protocol, which the relevant devices may implement.

When a validity period of the first authentication token expires, a second authentication token for reissuing the first authentication token, that is, a refresh token, may be transmitted to the first external device 131 (S1110). Subsequently, the first authentication token may be obtained from the first external device 131 based on the second authentication token (S1120). Specifically, the verification device 110 may transmit the second authentication token to the first external device 131 when the validity period of the first authentication token expires. Subsequently, upon receiving the second authentication token from the verification device 110, the first external device 131 may reissue the first authentication token corresponding to the second authentication token, and may transmit the first authentication token to the verification device 110. The second authentication token may be generated together with the first authentication token in initial generation of the first authentication token, and may be transmitted to the verification device 110. A validity period of the second authentication token may be longer than the validity period of the first authentication token. Thus, even when the validity period of the first authentication token expires, the validity period of the second authentication token may not expire. Using the second authentication token with the remaining validity period enables the verification device 110 to be reissued the first authentication token by a simpler authentication process than that illustrated in FIG. 10.

Figure 12:
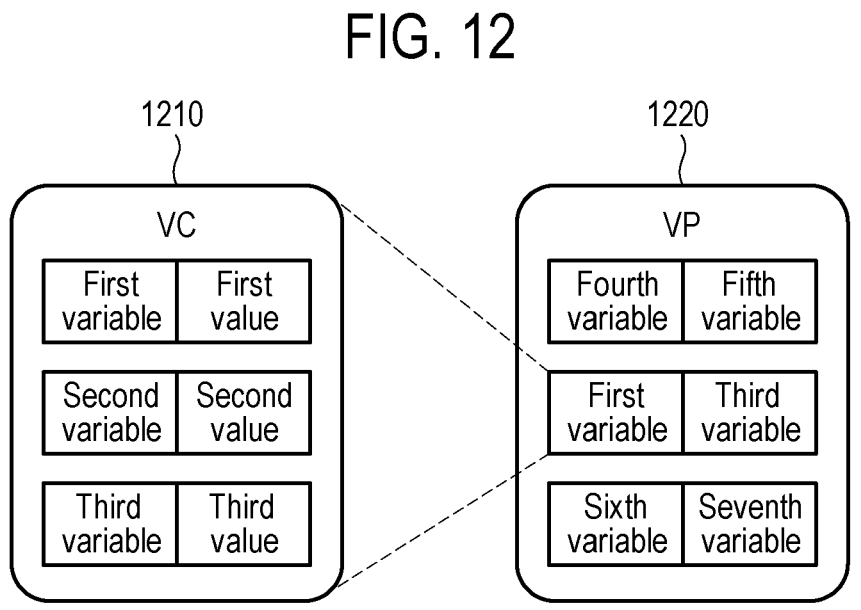
FIG. 12 illustrates a certificate and a submission certificate, according to one or more embodiments.

FIG. 12 illustrates a certificate 1210 and a submission certificate 1220 that can be referenced in one or more embodiments. The certificate 1210 and the submission certificate 1220 illustrated in FIG. 12 may be documents (data structures) that can be referenced for decentralized identity authentication. Decentralized identity authentication (DID Auth) may involve authenticating a user (or user information) through interaction between a user terminal 120 and a verification device 110. Here, the user may autonomously control a right to generate an identifier (decentralized identity (DID)) or the submission certificate 1220, thereby performing authentication even in a situation where the user does not reveal unintended information.

The certificate 1210, that is, a verifiable credential (VC), may refer to a document that verifies specific information related to the user as a verifiable certificate of qualification and a real identification used by the user. For example, the certificate 1210 may refer to a certificate indicating qualification of the user, such as a resident registration certificate, a passport, a license, a graduation certificate, or an employment certificate (such certificates being authenticable or authenticated by respective issuing authorities). The VC disclosed herein may be used as an identification for verifying ownership of a non-fungible token. That is, the non-fungible token itself may be a document that verifies the specific information related to the user.

The VC may be issued by an issuer and submitted to any arbitrary operator/entity. For example, the certificate 1210 may be issued by a non-fungible token generation entity and submitted to an entity operating the verification device 110.

However, since the certificate 1210 is the non-fungible token itself, information about the non-fungible token that the user does not intend to transmit (disclose) may be transmitted to the operator (i.e., the operating entity of the verification device 110). Therefore, the user may generate the submission certificate 1220, that is, a verifiable presentation, to include one or more verification items, based on the certificate 1210. In other words, the user may have the right to have control over a verification process related to the ownership of the non-fungible token.

The verifiable presentation (VP) may be a set of individually verifiable provided data, and may be a document processed to include select information included in the VC, thus avoiding having to submit the VC (and all of its information) to the operator.

Regarding the verification items that may be included in the submission certificate 1220, in an embodiment, the verification items may include an item about a list of non-fungible tokens. The item about the list may include one or more sub-items about one or more non-fungible tokens included in the list. For example, the one or more sub-items may include a token identifier of a non-fungible token, metadata of a non-fungible token, a contract address of a non-fungible token, the number of non-fungible tokens, a price/value of a non-fungible token, a market in which a non-fungible token is traded, a wallet address of a non-fungible token, and/or a digital asset of a non-fungible token, etc.

In some embodiments, the one or more verification items in the submission certificate 1220 may include an item about a virtual space. The item about the virtual space may include one or more sub-items about the virtual space. For example, the one or more sub-items may be a type of the virtual space, an area of the virtual space, a service set activated in the virtual space, and/or a virtual space identifier for identifying the virtual space, etc. In still another embodiment, the one or more verification items may include an item about an event. The item about the event may include one or more sub-items about an event happening in a virtual space. For example, the one or more sub-items may include the type of the event, a period of the event, or an organizer of the event.

Generation of the submission certificate 1220 may involve the user selectively including at least some of the items described above through the user terminal 120 by using the certificate 1210, that is, the non-fungible token itself. A method for generating the submission certificate 1220 based on the certificate 1210 is described with reference to FIG. 14.

Figure 13:
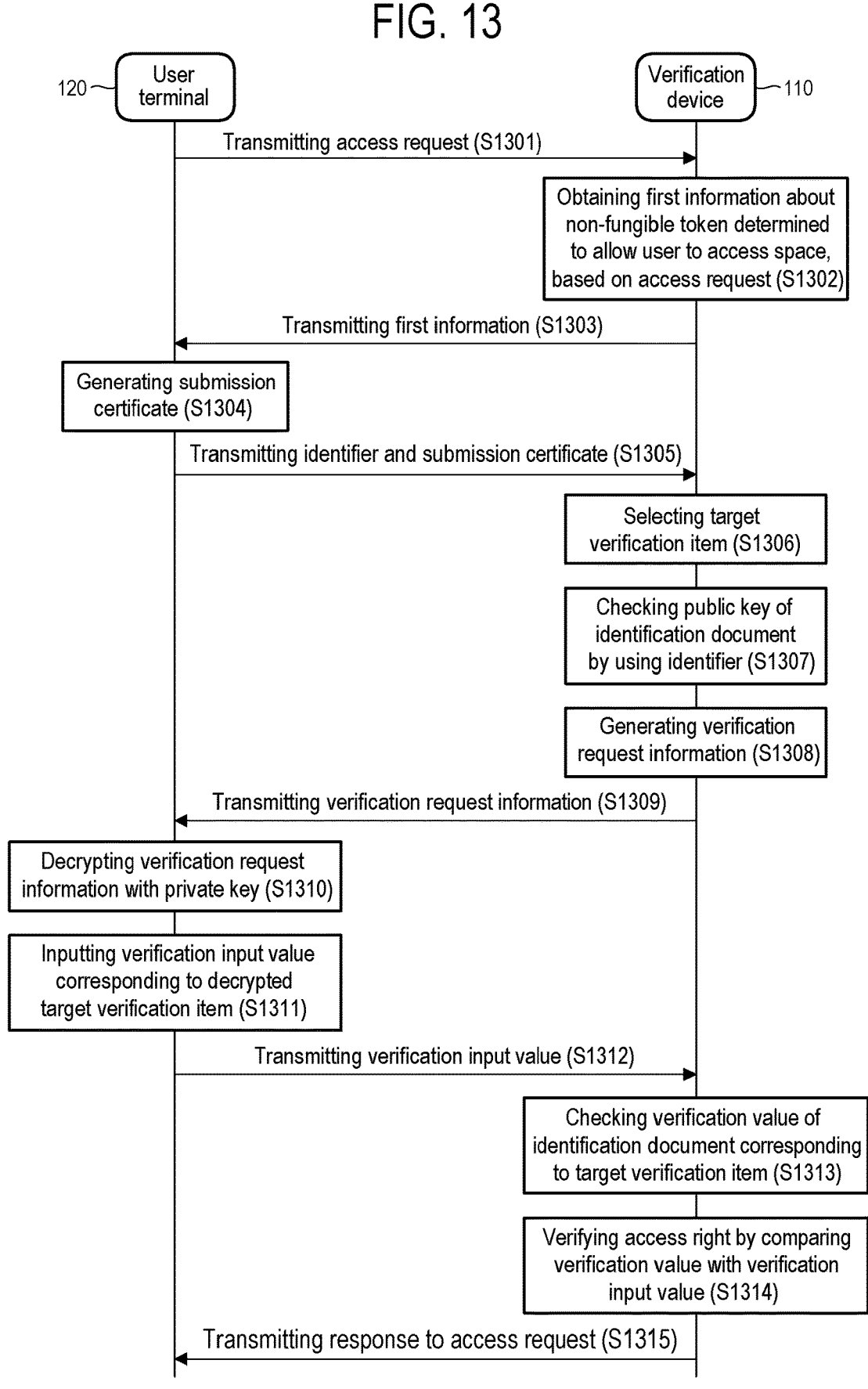
FIG. 13 illustrates a method according to one or more embodiments.

FIG. 13 illustrates a method according to one or more embodiments. The method illustrated in FIG. 13 may involve processing decentralized identity authentication by using the submission certificate 1220 described with reference to FIG. 12.

A user terminal 120 may transmit an access request to a verification device 110 (S1301). This operation may be generally the same as the operation of obtaining the access request (S610) in FIG. 6.

The verification device 110 may obtain, based on the access request, first information about non-fungible tokens, where the first information is determined for determining whether to allow users to access a virtual space (S1302). This operation may be generally the same as the operation of obtaining the first information (S620) in FIG. 6. The first information may be information that needs to be satisfied by non-fungible tokens of users in order to be authorized to access the virtual space, The verification device 110 may transmit the first information to the user terminal 120 (S1303). The user terminal 120 may identify (and may form) the non-fungible token that is to be used for accessing the virtual space based by satisfying the requirements of the first information. The non-fungible token may be a certificate 1210 (document) to be used for verifying qualification for accessing the virtual space corresponding to the access request.

The user terminal 120 may generate a submission certificate 1220, based on the certificate 1210 (S1304). That is, the user terminal 120 may obtain the first information including information related to the non-fungible token for accessing the virtual space to which access is requested from the verification device 110. With this information, the user terminal 120 knows what information (second information) must be provided to satisfy the first information. The user terminal 120 may generate the submission certificate 1220, based on the non-fungible token (certificate 1210) and the first information to enable verifying, by the verification device 110, of qualification for accessing the virtual space. In other words, the user terminal 120 may generate the submission certificate 1220 to include pieces of information related to the first information in the submission certificate 1220. A method for generating the submission certificate 1220 will be described in detail with reference to FIG. 14.

The user terminal 120 may transmit an identifier (e.g., a DID identifier) and the submission certificate 1220 to the verification device 110 (S1305). The identifier may be an identifier of the user related to decentralized identity authentication, and may include (or may be), for example, a storage location of an identification document (DID document), e.g., a location/address of aa specific block in a blockchain in which the identification document is recorded. The identification document may include one or more verification items included in the submission certificate 1220, one or more verification values corresponding to the verification items, and a public key of the user.

The verification device 110 may select a target verification item to be used for determining (e.g., by the verification device 110), according to the one or more verification items included in the submission certificate 1220 (S1306), whether the user is authorized to access the virtual space. In some implementations, the verification device 110 may randomly select the target verification item(s) among the one or more verification items; the randomly selected target verification item(s) may be used for the verification. Other methods of selecting a subset of verification items may be used.

The verification device 110 may check the public key of the identification document by using the identifier (S1307), may generate verification request information by encrypting the selected target verification item with the public key (S1308), and may transmit the verification request information to the user terminal 120 (S1309).

Regarding generating the verification request information (S1308), in embodiments, the verification device 110 may generate the verification request information by encrypting unique information for determining legitimacy of a verification procedure with the public key. The verification device 110 may have a process of randomly generated character strings for verification requests, and the unique information may be such a randomly generated character string that is assigned for the verification request information.

The user terminal 120 may decrypt the verification request information with a private key of the user that corresponds to the public key (S1310). Since the private key is not externally disclosed (i.e., not included in the identification document) and is secretly used, only the user using the user terminal 120 is allowed to check the target verification item selected by the verification device 110. Based on that check, the user terminal 120 may receive, from an input of the user, a verification input value corresponding to the decrypted target verification item (S1311), and may transmit the verification input value to the verification device 110 (S1312). The user input (verification input) may be used (e.g., at step S1314) to determine whether the user input matches or satisfies a verification value corresponding to a verification item.

Regarding the operation of transmitting the verification input value (S1312), in some embodiments, the user terminal 120 may transmit the unique information (e.g., random string) included in the verification request information (and decrypted with the private key) to the verification device 110. When the decrypted unique information is determined by the verification device 110 to match the unique information that it originally generated, reliability of the legitimacy of the verification procedure may be improved.

The verification device 110 may check a verification value of the identification document corresponding to the target verification item (S1313). Since the identification document includes the one or more verification items included in the submission certificate 1220 and the one or more verification values corresponding to the verification items, it is possible to determine authenticity of the verification input value obtained from the user terminal 120 in a subsequent operation by checking the identification document.

The verification device 110 may verify an access right by comparing the verification value with the verification input value (S1314). Specifically, when the verification value matches the verification input value, the verification device 110 may verify that the user has the access right, and when the verification value does not match the verification input value, the verification device 110 may verify that the user has no access right.

Regarding the operation of determining the legitimacy of the verification procedure, the verification device 110 may verify the access right based on whether the verification input value is obtained from the user terminal 120 within a threshold period from a time when the verification request information is transmitted to the user terminal 120. That is, the verification device 110 may compare a time when the verification input value is obtained with the time when the verification request information is transmitted, may process the verification procedure as legitimate when the verification procedure is processed within the threshold period, and may process the verification procedure as illegitimate when the verification procedure is not processed within the threshold period. An operating entity of a space platform may appropriately adjust the threshold period according to the needs of any particular implementation. In other words, the operating entity of the space platform may adjust how stringent the verification procedure is by increasing or decreasing the threshold period.

The verification device 110 may transmit a response to the access request to the user terminal 120 (S1315). This operation may be generally the same as the operation of transmitting the response (S640) in FIG. 6.

FIG. 14 illustrates a method according one or more embodiments of the present disclosure. The method illustrated in FIG. 14 may be for generating the submission certificate 1220 described with reference to FIG. 12. The method illustrated in FIG. 14 may be an implementation of the operation of generating the submission certificate 1220

(S1304) described with reference to FIG. 13. In the following description of FIG. 14, each operation is performed by the user terminal 120.

A second information set, which is information about a non-fungible token owned by a user, may be obtained based on first information (S1410) received earlier by the user terminal 120. As described with reference to FIG. 13, the first information is used in this operation (S1410) in that a submission certificate 1220 is generated such that pieces of information related to the first information are included in the submission certificate 1220 so that a legitimate verification procedure is able to be performed by the verification device 110. The second information set may be a set of information about the non-fungible token (description of one non-fungible token is readily extendable to multiple non-fungible tokens). For example, the second information set may include, as a variable, an item about a list of non-fungible tokens, a token identifier of each non-fungible token included in the list, metadata of each non-fungible token included in the list, a contract address of each non-fungible token included in the list, the number of non-fungible tokens included in the list, a price/value of each non-fungible token included in the list, a market in which each non-fungible token included in the list is traded, a wallet address of each non-fungible token included in the list, a digital asset of each non-fungible token included in the list, and/or any other information related to the non-fungible token(s). Further, the second information set may include a value corresponding to the foregoing item as a value corresponding to the variable.

A third information set about a virtual space to which access is allowed based on the non-fungible token owned by the user may be obtained based on the second information set, and a fourth information set about an event corresponding to the virtual space may be obtained based on the second information set or the third information set (S1420).

The third information set may be a set of information (about the virtual space) upon which access may be determined to be allowed based on ownership of the non-fungible token owned by the user. The third information set may include, for example, as a variable, an item about a type of the virtual space, an area of the virtual space, a service set activated in the virtual space (or the area of the virtual space), and/or a virtual space identifier for identifying the virtual space. Further, the third information set may include a value corresponding to the foregoing item above as a value corresponding to the variable. In an embodiment, a mapping relationship between the non-fungible token and the virtual space may be determined in advance, thereby obtaining the third information set based on the second information set.

The fourth information set may be a set of information about the event corresponding to the virtual space. The event may be a transient event (i.e., not a permanent part of the virtual space). The fourth information set may include, as a variable, for example, an item about a type of the event, a time period of the event, an organizer of the event, and/or the like. In addition, the fourth information set may include a value corresponding to the foregoing item above as a value corresponding to the variable. In an embodiment, a mapping relationship between the non-fungible token or the virtual space and the event may be determined in advance, thereby allowing obtaining the fourth information set based on the second information set or the third information set.

At least some of the pieces of information included in the second information set, the third information set, and the fourth information set may be selected (S1430). In an embodiment, the at least some of the pieces of information included in the second information set, the third information set, and the fourth information set may be selected according to (i) the user's intent (e.g., according to an input inputted via the user terminal 120) or (ii) the first information obtained from a verification device 110 to generate the submission certificate 1220 suitable for the verification procedure. The of the information selected in this operation (S1430) may be information corresponding to the second information about the non-fungible token owned by the user described with reference to FIG. 9, and may be information used for the verification procedure.

The submission certificate 1220 may be generated by deleting a value of each of the selected at least part of the information (S1440). Since the submission certificate 1220 may be a document transmitted to an operator, the value of each piece of the selected information may be deleted so that the user may have the right to control the verification procedure related to the ownership of the non-fungible token (e.g., to control what token related information is to be disclosed). The generated submission certificate may be used for a series of operations of processing decentralized identity authentication as illustrated in FIG. 13.

A space according to various embodiments of the present disclosure may be understood as a real space. When a technical idea disclosed herein is applied to the real space, the technical idea may be understood as an embodiment in which a user autonomously accesses a space (e.g., a concert hall) or a specific area of the space (e.g., a specific area of the concert hall) through a verification procedure using a user terminal 120. In this case, a response transmitted to the user terminal 120 may be a message indicating success or failure in verification of an access right. Nonetheless, in such cases, the real/physical space may be modeled by a virtual space to enable the access control described herein.

According to the present disclosure, it may be possible to use a non-fungible token as a de facto admission ticket to a space.

According to the present disclosure, it may be possible to prove ownership of a non-fungible token.

According to the present disclosure, it may be possible to improve user convenience in proving a non-fungible token.

According to the present disclosure, it may be possible to provide a user with the right to control a verification procedure related to ownership of a non-fungible token (e.g., to enable a user to control what token information is disclosed).

According to the present disclosure, it may be possible to protect personal information about a user by the user autonomously selecting information to be disclosed in proving ownership of a non-fungible token sufficient to be granted access to a space.

Effects of the technical ideas disclosed herein are not limited to (or necessarily required to include) the effects mentioned above, and other effects not mentioned will be understood by those skilled in the art from the description of the present disclosure.

The computing apparatuses, the electronic devices, the processors, the servers, the memories, the displays, the information output system and hardware, the storage devices, and other apparatuses, devices, units, modules, and components described herein with respect to FIGS. 1-14 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method comprising:

obtaining, from a terminal operated by a user, by a processor connected with a computer network comprising a blockchain service, an access request to request access to an area of a virtual space comprising a plurality of areas;

based on the access request, obtaining, by the processor, first information comprising non-fungible token information, the first information configured to be used to determine whether the user is authorized to access the area of the virtual space;

verifying, by the processor, an access right of whether the area of the virtual space is accessible to the user by determining whether a non-fungible token is owned by the user and by determining, based on the first information, whether the non-fungible token satisfies the non-fungible token information of the first information; and based on a result of the verifying, transmitting to the terminal, by the processor, a response to the access request, wherein the verifying of the access right comprises:

determining values of two or more verification items in the first information, the two or more verification items including first contract address and second contract address, determining whether a third contract address of a first non-fungible token matches the value of the first contract address of the first information and a fourth contract address of a second non-fungible token matches the value of the second contract address of the first information, and upon the determinations that the third contract address and the fourth contract address match the values of the first contract address and the second contract address, respectively, determining that the user has the access right to the virtual space, and wherein the first non-fungible token is distinctive from the second non-fungible token, wherein the area, and a second area of the virtual space, are areas to which an object in the virtual space is moveable to, the object representing the user, and wherein the transmitting of the response comprises transmitting to the terminal a first response indicating that a first service set is activated responsive to the object accessing the first area and transmitting to the terminal a second response indicating that a second service set is activated responsive to the object accessing the second area.

2. The method of claim 1, wherein the first service set comprises one or more first interactive objects configured to interact with the object, and wherein the second service set comprises one or more second interactive objects configured to interact with the object.

3. The method of claim 1, wherein the verifying of the access right comprises:

obtaining second information about the non-fungible token of the user, the second information comprising a second item, and the first information comprising a first item; and verifying that the user has the access right to the area by determining that the first item corresponds to the second item.

4. The method of claim 3, wherein the one or more first items comprise a first list of non-fungible tokens determined to enable the access, a token identifier, metadata, and a contract address of each non-fungible token included in the first list, and/or a virtual space identifier for identifying the virtual space, and wherein the one or more second items comprise a second list of non-fungible tokens owned by the user, a token identifier, metadata, and a contract address of each non-fungible token included in the second list, and/or a virtual space identifier for identifying a virtual space related to each non-fungible token included in the second list.

5. The method of claim 1, wherein the transmitting of the response comprises transmitting, to the terminal, a link that enables access to the virtual space corresponding to the access request.

6. A method performed by one or more computing devices, the method comprising:

obtaining, by a processor connected with a computer network comprising a blockchain network, from a terminal of a user, an access request to request access to an area of a virtual space comprising multiple areas;

obtaining, based on the access request, by the processor, first information comprising non-fungible token information, the first information determined to be used to authorize access to the area;

obtaining, by the processor, second information about a non-fungible token owned by the user, wherein the second information is obtained from a non-fungible token platform;

verifying, by the processor, an access right of whether the user is authorized to access the area by determining that the non-fungible token is owned by the user, and by determining, based on the first information and the second information, whether the non-fungible token owned by the user corresponds to the first information about a non-fungible token; and transmitting, by the processor, to the terminal, a response to the access request, wherein the response is based on a verification result of the verifying, wherein the verifying of the access right comprises:

determining values of two or more verification items in the first information, the two or more verification items including first contract address and second contract address, based on the second information, determining whether a third contract address of a first non-fungible token matches the value of the first contract address of the first information and a fourth contract address of a second non-fungible token matches the value of the second contract address of the first information, and upon the determinations that the third contract address and the fourth contract address match the values of the first contract address and the second contract address, respectively, determining that the user has the access right to the virtual space, and wherein the first non-fungible token is distinctive from the second non-fungible token, wherein the area, and a second area of the virtual space, are areas to which an object in the virtual space is moveable to, the object representing the user, and wherein the transmitting of the response comprises transmitting to the terminal a first response indicating that a first service set is activated responsive to the object accessing the first area and transmitting to the terminal a second response indicating that a second service set is activated responsive to the object accessing the second area.

7. The method of claim 6, wherein the obtaining of the second information comprises:

obtaining a first authentication token from a first external device related to authentication of the non-fungible token platform, based on user information about the user;

requesting the second information from a second external device related to a resource of the non-fungible token platform by using the first authentication token; and obtaining the second information from the second external device.

8. A method comprising:

obtaining, from a terminal of a user, an access request to request access to an area of a virtual space comprising multiple areas including the area;

obtaining, based on the access request, first information comprising non-fungible token information configured to be used to verify user access to the area;

obtaining, from the terminal, a submission certificate generated based on the first information and proving that the user owns a non-fungible token;

verifying, based on the submission certificate, an access right of the user to access the area by determining that the user owns the non-fungible token; and transmitting, by the processor, a response to the access request to the terminal of the user, based on a verification result, wherein the verifying of the access right comprises:

determining values of two or more verification items in the first information, the two or more verification items including first contract address and second contract address, based on the submission certificate, determining whether a third contract address of a first non-fungible token matches the value of the first contract address of the first information and a fourth contract address of a second non-fungible token matches the value of the second contract address of the first information, and upon the determinations that the third contract address and the fourth contract address match the values of the first contract address and the second contract address, respectively, determining that the user has the access right to the virtual space, and wherein the first non-fungible token is distinctive from the second non-fungible token, wherein the area, and a second area of the virtual space, are areas to which an object in the virtual space is moveable to, the object representing the user, and wherein the transmitting of the response comprises transmitting to the terminal a first response indicating that a first service set is activated responsive to the object accessing the first area and transmitting to the terminal a second response indicating that a second service set is activated responsive to the object accessing the second area.

9. The method of claim 8, wherein the submission certificate comprises one or more verification items about the non-fungible token owned by the user, and wherein the verifying of the access right comprises:

selecting a target verification item among the one or more verification items; and verifying the access right based on a verification input value of the user obtained corresponding to the target verification item.

10. The method of claim 9, wherein the obtaining of the submission certificate comprises obtaining an identifier of the user, wherein the identifier comprises a storage location of an identification document in a blockchain network, and wherein the identification document comprises the one or more verification items, one or more verification values corresponding to each of the one or more verification items, and a public key of the user.

11. The method of claim 10, wherein the obtaining of the submission certificate comprises:

transmitting the first information to the terminal of the user; and obtaining a submission certificate comprising a verification item corresponding to one or more first items included in the first information from the terminal of the user in response to transmission of the first information, and wherein the one or more first items comprise a first list of non-fungible tokens determined to enable the access, a token identifier, metadata, a contract address of each non-fungible token included in the first list, and a virtual space identifier for identifying the virtual space.

12. The method of claim 11, wherein the verifying of the access right comprises:

generating verification request information by encrypting the target verification item with the public key;

transmitting the verification request information to the terminal of the user;

obtaining a verification input value corresponding to the target verification item decrypted with a private key corresponding to the public key from the terminal of the user in response to the verification request information; and verifying the access right by identifying whether a verification value corresponding to the target verification item included in the identification document obtained from the blockchain network corresponds to the verification input value obtained from the terminal of the user.

13. A method comprising:

receiving a request to access an area of a virtual space, wherein the request is generated responsive to an interaction, based in input of a user, with the virtual space;

based on the request, obtaining an access authorization condition;

based on the request, obtaining non-fungible token information about a non-fungible token owned by the user; and authorizing access to the area of the virtual space for the user by determining that the non-fungible token is owned by the user and that the non-fungible token information satisfies the access authorization condition, wherein the authorizing access to the area of the virtual space for the user comprises:

determining values of two or more verification items in the first information, the two or more verification items including first contract address and second contract address, based on the access authorization condition, determining whether a third contract address of a first non-fungible token matches the value of the first contract address of the first information and a fourth contract address of a second non-fungible token matches the value of the second contract address, and upon the determinations that the third contract address and the fourth contract address match the values of the first contract address and the second contract address, respectively, determining that the user has the access right to the virtual space, and wherein the first non-fungible token is distinctive from the second non-fungible token, wherein the area, and a second area of the virtual space, are areas to which an object in the virtual space is moveable to, the object representing the user, and wherein the transmitting of the response comprises transmitting to the terminal a first response indicating that a first service set is activated responsive to the object accessing the first area and transmitting to the terminal a second response indicating that a second service set is activated responsive to the object accessing the second area.

14. The method of claim 13, further comprising:

obtaining, based on user information about the user, a first authentication token from a first external device related to authentication of a non-fungible token platform;

requesting the non-fungible token information from a second external device related to a resource of the non-fungible token platform by using the first authentication token; and obtaining the non-fungible token information from the second external device.

15. The method of claim 13, wherein the interaction with the virtual space comprises determining, by a platform providing the virtual space, that an object manipulated by user input has encountered the area of the virtual space.

16. The method of claim 13, wherein the granting access enables a device operated by the user to access a set of services associated with the area.

17. The method of claim 13, wherein the granting access further comprises determining that the non-fungible token is owned by the user.

18. The method of claim 13, wherein the non-fungible token is generated by a smart contract.

* * * * *